(12) United States Patent
Kimura et al.

(10) Patent No.: US 6,256,545 B1
(45) Date of Patent: Jul. 3, 2001

(54) ACTIVE VIBRATION REDUCING CONTROL APPARATUS AND METHOD APPLICABLE TO VEHICULAR ACTIVE ENGINE MOUNT

(75) Inventors: Takeshi Kimura, Yokohama; Shigeki Satoh, Kanagawa, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/096,191

(22) Filed: Jun. 12, 1998

(30) Foreign Application Priority Data

Jun. 13, 1997 (JP) .................................................. 9-156604

(51) Int. Cl.$^7$ .................................................. G05B 13/02
(52) U.S. Cl. ........................... 700/28; 700/280; 700/279; 700/188; 702/56; 381/71.4
(58) Field of Search .............................. 700/28, 280, 279, 700/188, 191; 702/56, 191, 192–195; 381/71.4, 71.7, 71.9, 71.12

(56) References Cited

U.S. PATENT DOCUMENTS

| | | | |
|---|---|---|---|
| 5,647,579 | * | 7/1997 | Satoh .............................. 267/140.14 |
| 5,910,993 | * | 6/1999 | Aoki et al. ........................ 381/71.12 |
| 5,950,756 | * | 9/1999 | Satoh et al. ......................... 180/312 |
| 6,018,689 | * | 1/2000 | Kumura et al. . |

FOREIGN PATENT DOCUMENTS 3-259722 11/1991 (JP) .
6-332471 2/1994 (JP) .

* cited by examiner

Primary Examiner—Ario Etienne
Assistant Examiner—Firmin Backer
(74) Attorney, Agent, or Firm—Foley & Lardner

(57) ABSTRACT

In apparatus and method for actively reducing a vibration developed from a vibration source applicable to a vehicular active engine mount, an identification signal supplier is provided for previously supplying each of identification signals in sinusoidal waveforms to a control vibration source, a response signal reader is provided for reading a residual vibration signal when a control vibration according to each of the identification signals is developed from the control vibration source, a transfer function identifier is provided for identifying the transfer function on the basis of the residual vibration signal read by the response signal reader; and a frequency selector for selecting one by one frequencies of the identification signals in the sinusoidal waveforms, the frequency selector selecting the frequencies of the respective identification signals in the sinusoidal waveforms so that a frequency interval between mutually adjacent selected frequencies in a particular frequency band is shorter than that in any other frequency bands. In addition, a phase lag providing block and/or a gain characteristic corrector is provided.

21 Claims, 18 Drawing Sheets

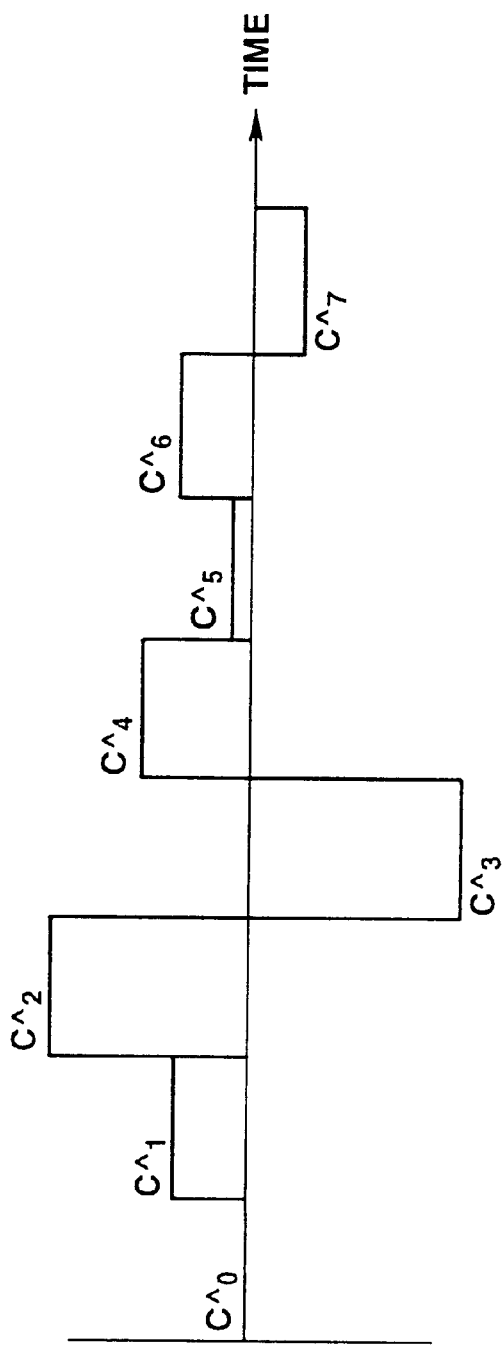
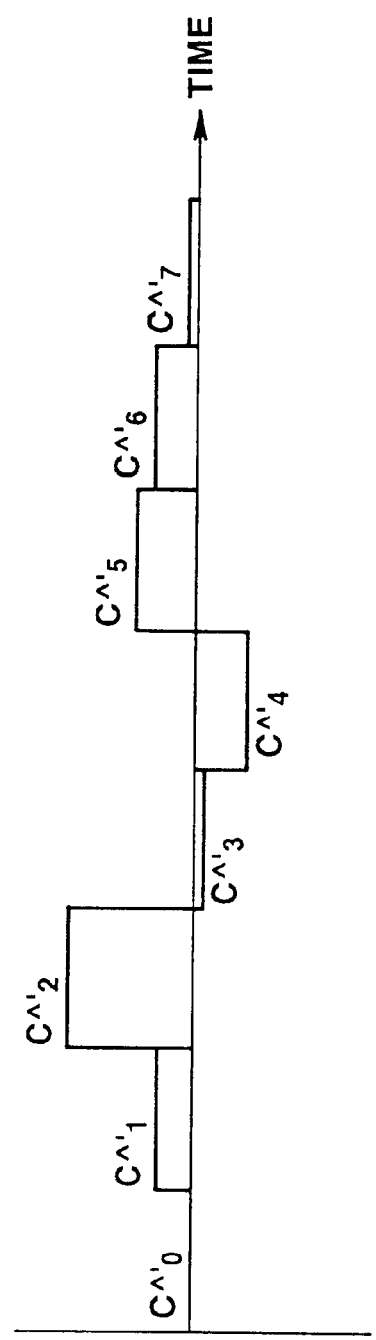
FIG.14A
FIG.14B $T_0$ $T_0/2$

START READ OF e

ACTIVE VIBRATION REDUCING CONTROL APPARATUS AND METHOD APPLICABLE TO VEHICULAR ACTIVE ENGINE MOUNT

The contents of the Applications No. Heisei 9-156604, with a filing date of Jun. 13, 1997 in Japan are herein incorporated by reference.

BACKGROUND OF THE INVENTION a) Field of the Invention

The present invention relates generally to actively vibration reducing control apparatus and method applicable to a vehicular engine mount on which a vehicular engine as a vibration source is mounted.

The present invention particularly relates to adaptive control apparatus and method for actively reducing the vibration transmitted from the vehicular engine in which a control vibration developed from a control vibration source is interfered against a vibration transmitted from the engine to a vehicle body to reduce the transmission of the vibration and a load of an identification operation for a transfer function between the control vibration source and a residual vibration detector included in a control algorithm to drive the control vibration source is reduced and an improvement in an accuracy of the identification on the transfer function is achieved.

b) Description of the Related Art

In a case of various previously proposed active vibration reducing control apparatuses, transfer functions, each transfer function being established between a control vibration source and a residual vibration detector, are mutually different from each other according to characteristic deviations for respective apparatuses to which the previously proposed active vibration reducing control apparatus are applied and for respective installations on which the previously proposed actively vibration reducing apparatuses are installed.

In addition, there is a possibility that each of the transfer functions is varied from its originally established state due to its characteristic variation along with a use of the apparatus to which each of the previously proposed active vibration reducing apparatus is applied.

Hence, in order to execute a highly accurate vibration reducing control, it is desirable to identify the transfer function after each one of the previously proposed actively vibration reducing control apparatuses is incorporated into the apparatus to which each one thereof is applied or it is desirable to identify the transfer function whenever a regular check for the apparatus to which each one thereof is applied.

A Japanese Patent Application First Publication No Heisei 6-332471 published on Dec. 2, 1994 exemplifies a technique for identifying the transfer function described above.

In the above-identified Japanese Patent Application First Publication, an identification sound or an identification vibration is caused to be developed according to an impulse signal from a control source or a control vibration source and its response is measured by means of a residual noise detector or a residual vibration detector.

Consequently, the identification of the transfer function required in the control algorithm of an active noise controller or an active vibration controller can be achieved.

A time at which the identification sound or the identification vibration is developed according to the impulse signal is limited to a time immediately before the time transferred from a state in which a noise or the vibration from a noise source or a vibration source is not developed to a state in which the noise or the vibration is developed. Hence, the identification of the transfer function can be made without introduction of a remarkable increase in a calculation load on the controller and without an unpleasant feeling given to a human kind.

Furthermore, a Japanese Patent Application First Publication No. Heisei 3-259722 published on Nov. 19, 1991 exemplifies another technique of the identification of the transfer function.

In the latter Japanese Patent Application First Publication, a noise reducing apparatus in which a noise developed by a compressor installed in a refrigerator and radiated externally through a mechanical room duct is cancelled before the noise is to be radiated externally through the duct, a loud speaker and a microphone are installed to perform a noise reduction control within the duct, the control noise is developed from the loud speaker according to the drive state of the compressor to reduce the noise, and the identification sound is developed from the loud speaker according to a white noise whenever the compressor is halted in order to prevent a noise control characteristic from being deteriorated, and the transfer function between the loud speaker and the microphone is measured to identify a transfer function filter.

SUMMARY OF THE INVENTION

Since the identification of the transfer function required in the control is possible for each apparatus to which any one of previously proposed active vibration or noise reducing control apparatuses is applied, a highly accurate vibration reducing control can be expected.

On the other hand, although it is necessary to develop the identification sound according to the impulse signal or the white noise signal in order to identify the transfer function, the impulse signal or the white noise signal is a signal having frequency components of all frequency bands.

Hence, even though the identification sound is developed, an output is dispersed over a wide frequency band.

Then, if the whole output of the identification sound is sufficiently high, the output for each frequency component is slight so that the identification of the transfer function becomes insufficient.

Hence, it is required to develop the identification sound at a high output in order to sufficiently obtain the output for each frequency component.

To meet such a requirement as described above, since it is easy to apply the development of the identification sound at the high output to the actively noise reducing control apparatus in which the loud speaker is a control noise source if the loud speaker which can provide a large output power is secured in a space of a sufficient margin, the above requirement can be achieved with a relatively easiness.

However, in the case where the above requirement is applied to the actively vibration reducing control apparatus in which the vibration transmitted, e.g., from a vehicular engine to a vehicular body is reduced by a development of an active supporting force interposed between the vehicular engine and the vehicle body through an active engine mount, there is a limit in the active supporting force which can be developed by the active engine mount.

Hence, even though a large amplitude impulse signal or a large amplitude white noise is supplied to the active engine mount as the control vibration source, a level of the identification sound (or vibration) actually developed is not so high and it takes a long time to identify the transfer function.

In addition, when the actual vibration reducing control apparatus for the engine as the vibration source, the vibration developed from the vibration source is not a vibration such as the white noise which covers all frequency bands but generally a vibration concentrated into a particular frequency.

Hence, the identification sound (or vibration) using the white noise signal often cannot carry out the identification of the transfer function suitable for an actual use condition.

Furthermore, suppose a situation under which an actual identification of the transfer function is carried out.

In the case of the actively vibration reducing control apparatus, it is necessary to identify the transfer function using a controller mounted in the vehicle to carry out the identification of the transfer function for each vehicle in which the actively vibration reducing apparatus is mounted in an assembly line of a factory.

In addition, a time required to complete the identification is needed to be finished in a short period of time so as not to give a large influence on an assembly speed in the factory.

In other words, the identification in the transfer function for each vehicle is needed to be carried out by the controller mounted in each vehicle and having a relatively low capability and to be completed within a limited time period as is different from that carried out using a computer mounted in an experiment room, having a relatively high capability and having a large memory capacity.

It is therefore an object of the present invention to provide adaptive control apparatus and method for actively reduction a vibration applicable to a vehicular active engine mount which can relieve a load of an identification process of a transfer function required for the vibration reduction control and can improve an accuracy of the identification of the transfer function.

According to one aspect of the present invention, there is provided with an adaptive control apparatus comprising: a vibration source; a control vibration source which is enabled to develop a control vibration to be interfered against a vibration developed from the vibration source; a reference signal generator for detecting a vibration developed condition of the vibration source and outputting the vibration developed condition indicative signal as a reference signal; a residual vibration detector for detecting a residual vibration signal after the interference of the control vibration against the vibration; an active vibration controller for driving the control vibration source so as to reduce the vibration using a control algorithm including a transfer function between the control vibration source and the residual vibration detector on the basis of the reference signal and the residual vibration signal; an identification signal supplier for supplying each of identification signals in sinusoidal waveforms to the control vibration source; a response signal reader for reading the residual vibration signal when the control vibration according to each of the identification signals is developed from the control vibration source in synchronization with a sampling clock; a transfer function identifier for identifying the transfer function on the basis of the residual vibration signal read by the response signal reader; and a frequency selector for selecting one by one frequencies of the identification signals in the sinusoidal waveforms, the frequency selector selecting the frequencies of the respective identification signals in the sinusoidal waveforms so that a frequency interval between mutually adjacent selected frequencies in a particular frequency band is shorter than that in any other frequency bands.

According to another aspect of the present invention, there is provided with an adaptive control apparatus comprising: a vibration source; a control vibration source which is enabled to develop a control vibration to be interfered against a vibration developed from the vibration source; a reference signal generator for detecting a vibration developed condition of the vibration source and outputting the vibration developed condition indicative signal as a reference signal; a residual vibration detector for detecting a residual vibration signal after the interference of the control vibration against the vibration; an active vibration controller for driving the control vibration source so as to reduce the vibration using a control algorithm including a transfer function between the control vibration source and the residual vibration detector on the basis of the reference signal and the residual vibration signal; an identification signal supplier for supplying an identification signal in a sinusoidal waveform whose frequency is changeable to the control vibration source; a response signal reader for reading the residual vibration signal when the control vibration according to each of the identification signals is developed from the control vibration source in synchronization with a sampling clock; a transfer function identifier for identifying the transfer function on the basis of the residual vibration signal read by the response signal reader; and a frequency selector for changing and selecting the frequency of the frequency changeable identification signal in the sinusoidal waveform at a first predetermined interval of frequency when the frequency of the identification signal falls in a particular frequency band and at a second predetermined interval of frequency when the frequency falls in any other frequency bands than the particular frequency band, the first predetermined interval of frequency being shorter than the second predetermined interval of frequency.

According to a still another aspect of the present invention, there is provided with an adaptive control apparatus comprising: vibration source means; control vibration source means for developing a control vibration to be interfered against a vibration developed from the vibration source means; reference signal generating means for detecting a vibration developed condition of the vibration source means and outputting the vibration developed condition indicative signal as a reference signal; residual vibration detecting means for detecting a residual vibration signal after the interference of the control vibration against the vibration; active vibration controlling means for driving the control vibration source means so as to reduce the vibration using a control algorithm including a transfer function between the control vibration source means and the residual vibration detecting means on the basis of the reference signal and the residual vibration signal; identification signal supplying means for supplying each of identification signals in sinusoidal waveforms to the control vibration source means; response signal reading means for reading the residual vibration signal when the control vibration according to each of the identification signals is developed from the control vibration source means in synchronization with a sampling clock; transfer function identifying means for identifying the transfer function on the basis of the residual vibration signal read by the response signal reading means; and frequency selecting means for selecting one by one frequencies of the identification signals in the sinusoidal waveforms, the frequency selecting means selecting the frequencies of the respective identification signals in the sinusoidal waveforms so that a frequency interval between mutually adjacent selected frequencies in a particular frequency band is shorter than that in any other frequency bands.

According to a further still another aspect of the present invention, there is provided with a method for actively controlling a reduction of a vibration developed and transmitted from a vibration source, comprising the steps of: providing a control vibration source which is enabled to develop a control vibration to be interfered against the vibration developed from the vibration source; detecting a vibration developed condition of the vibration source and outputting the vibration developed condition indicative signal as a reference signal; detecting a residual vibration signal after the interference of the control vibration against the vibration; driving the control vibration source so as to reduce the vibration using a control algorithm including a transfer function between the control vibration source and the residual vibration detector on the basis of the reference signal and the residual vibration signal; supplying each of identification signals in sinusoidal waveforms to the control vibration source; reading the residual vibration signal when the control vibration according to each of the identification signals is developed from the control vibration source in synchronization with a sampling clock; identifying the transfer function on the basis of the residual vibration signal read at the previous reading step; and selecting one by one frequencies of the identification signals in the sinusoidal waveforms, the selecting step selecting the frequencies of the respective identification signals in the sinusoidal waveforms so that a frequency interval between mutually adjacent selected frequencies in a particular frequency band is shorter than that in any other frequency bands.

BRIEF DESCRIPTION OF THE DRAWINGS

FIGS. 14A and 14B are waveform charts for explaining the operation in the case of the fourth embodiment.

BEST MODE FOR CARRYING OUT THE INVENTION

Reference will hereinafter be made to the drawings in order to facilitate a better understanding of the present invention.

First Embodiment

FIGS. 1A through 6B show a first preferred embodiment of an actively vibration reducing control apparatus according to the present invention.

Figure 1A:
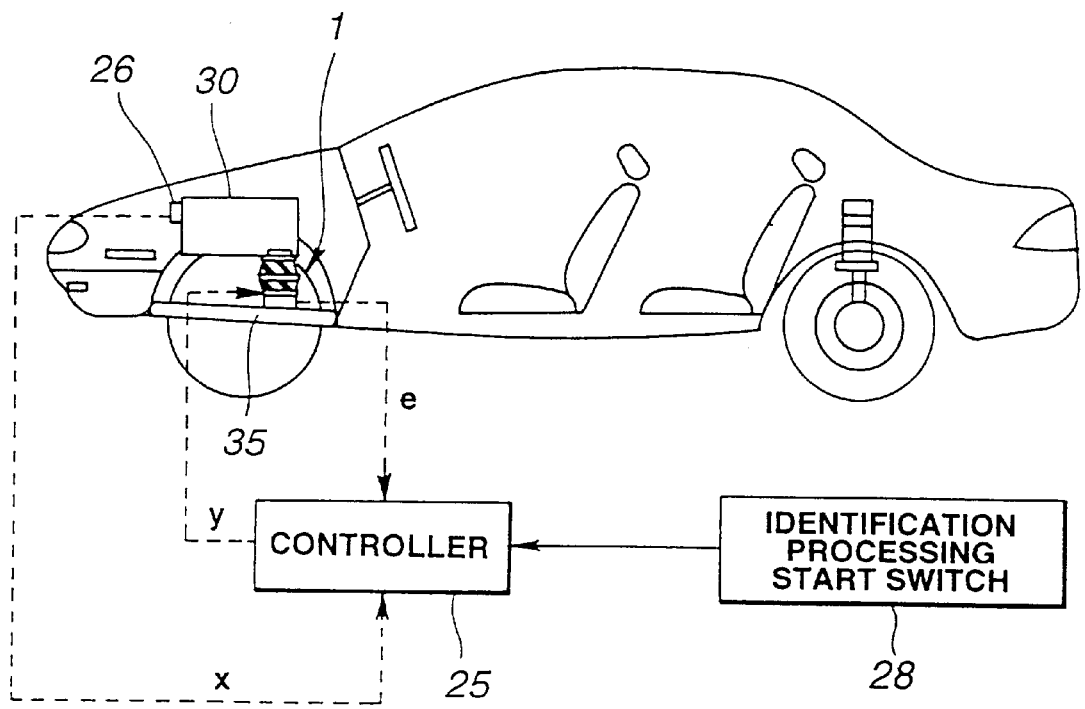
FIG. 1A is a schematic side view of an automotive vehicle in which an actively vibration reducing control apparatus in a first preferred embodiment according to the present invention is applicable.
Figure 1B:
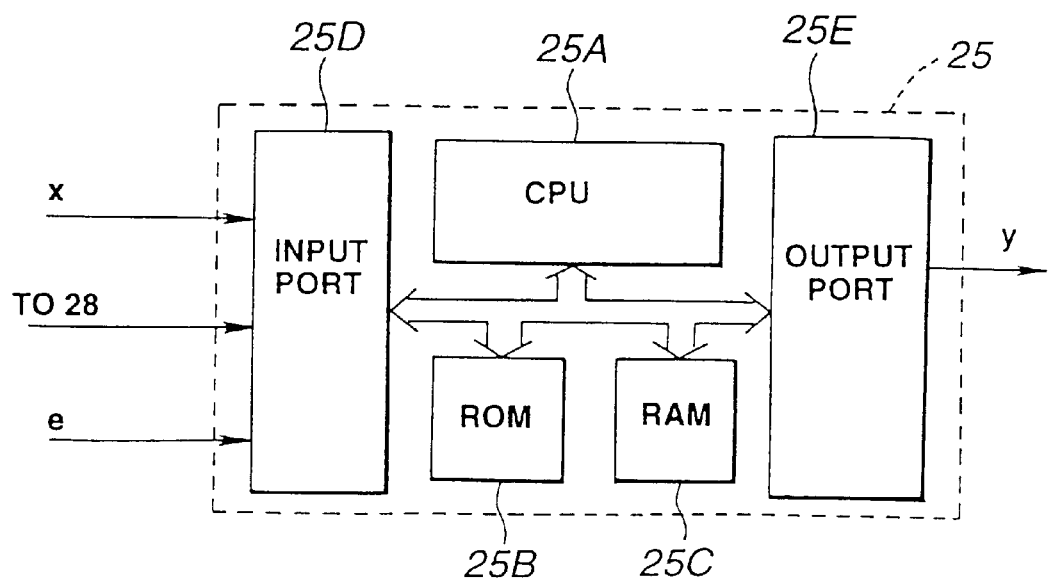
FIG. 1B is a circuit block diagram of an active vibration controller in the first embodiment shown in FIG. 1A.

FIG. 1A shows a rough side view of an automotive vehicle to which the actively vibration reducing control apparatus in the first embodiment is applicable.

In FIG. 1A, an engine 30 is supported on a vehicle body 35 constituted by a suspension member via an active engine mount 1 which is enabled to develop an active supporting force according to a drive signal.

Actually, a plurality of passive engine mounts developing respective passive supporting forces according to a relative displacement between the engine 30 and the vehicle body 30 are interposed between the engine 30 and the vehicle body 35.

Each of the passive engine mounts include, for example, a normal type engine mount for supporting a weight by means of a rubber-like elastic body or a well known fluid seal type mount simulator in which a fluid is sealed in an internal of the rubber-like elastic body so as to enabled to develop a damping force.

Figure 2:
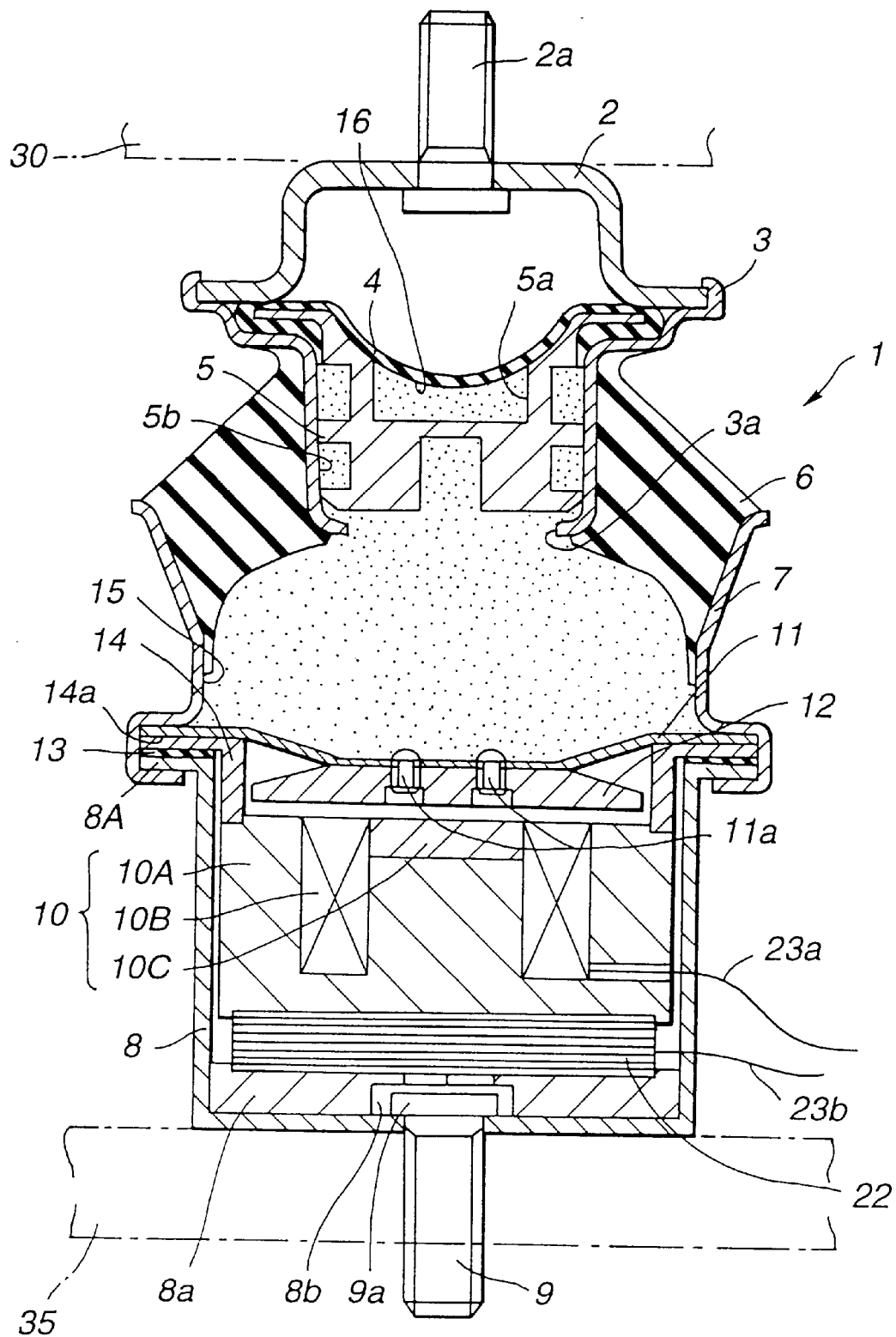
FIG. 2 is a cross sectional view of an example of a vehicular active engine mount to which the actively vibration reducing apparatus in the first embodiment shown in FIG. 1A is applicable.

On the other hand, FIG. 2 shows an example of the active engine mount 1 shown in FIG. 1A.

The active engine mount 1 shown in FIG. 2 includes: a bolt 2a for attaching an upper part of the active engine mount 1 integrally onto the engine 30; a bell-shaped encapsulation 2 having an inside portion thereof in a cavity form and having a lower portion opened; and an inner envelope 3 having its axis faced vertically, having an upper end portion caulked onto a lower outside surface of the encapsulation 2.

The inner envelope 3 is formed such that a diameter thereof at a lower end is shorter than that at an upper end thereof. Its lower end of the inner envelope 3 is bent inwardly and horizontally so that an opening 3a is formed thereat.

A diaphragm 4 is disposed whose end is inserted into a caulked portion between the encapsulation 2 and inner envelope 3 so as to partition an inner space of the encapsulation 2 and the inner envelope 3 into two. An upper space with respect to the diaphragm 4 is exposed to the atmospheric pressure via a hole (not shown) provided on a side surface of the encapsulation 2.

An orifice constituting member 5 is disposed within the inner side of the inner envelope 3. It is noted that, in the first embodiment, a membrane-shaped elastic body (may alternatively be an extended portion of an outer peripheral portion of the diaphragm 4) is interposed between the inner surface of the inner envelope 3 and orifice constituting member 5 so that the orifice constituting member 5 is tightly fitted onto the inner side of the inner envelope 3.

The orifice constituting member 5 is matched with the inner space of the inner envelope 3 so as to form approximately cylindrically.

a circular recess 5a and a portion of the orifice constituting member 5 faced against the opening 3a at the bottom surface of the inner envelope 3.

The orifice 5b includes: for example, a groove extended approximately spirally along an outer peripheral surface of the orifice constituting member 5, a flow passage communicating one end of the groove with the recess 5a; and a flow passage for communicating the other end of the groove with the opening 3a.

An inner surface of the inner envelope 3 is adhered onto an inner peripheral surface of a supporting elastic cylindrical form under a vulcanization. An inner peripheral surface of the inner envelope 3 is raised slightly upwardly. An outer peripheral surface of the supporting elastic body 6 is adhered onto an upper part of an inner peripheral surface of the outer envelope 7. A diameter of the outer envelope 7 at an upper part thereof is longer than that thereof at a lower part thereof.

An actuator casing 8 is formed in an approximately cylindrical shape having an opening at an upper surface thereof. A lower end of the outer envelope 7 is caulked onto an upper end of the actuator casing 8. A mounting bolt 9 is projected from a lower end surface of the actuator mounting bolt 9 has its head 9a housed in a cavity portion so as to extend over an inner bottom surface of the actuator casing 8.

Furthermore, an electromagnetic actuator 10 is disposed in an inner side of the actuator casing 8.

The electromagnetic actuator 10 includes: a cylindrical iron-made yoke 10A; an excitation coil 10B with its axis faced vertically; and a permanent magnet 10C having the magnetic pole surfaces and which is fixed on an upper surface of the center portion of the yoke 10A on which the excitation coil 10B is wound.

A flange portion 8A is formed on an upper end of the actuator casing 8. A peripheral edge of a circular metallic plate spring 11 is inserted into the caulked portion, a magnetizable magnetic path member 17 being fixed by means of a rivet 11a onto a center part of the plate spring 11.

It is noted that the magnetic path member 12 is an iron-made disc plate having a slightly smaller diameter than that of the yoke 10A and having a thickness such that its bottom surface approaches to the electromagnetic actuator 10.

Furthermore, a ring-shaped membrane elastic member 13 and a flange portion 14a of a force transmitting rigidity member 14 are supported on the caulked portion so as to be inserted into the flange 8A and the plate spring 11.

Specifically, the membrane-shaped elastic body 13, the flange portion 14a of the force transmitting rigidity member 14, and the plate spring 11 are sequentially overlapped in this sequence on the flange 8A of the actuator casing 8. The whole overlapped portion is integrally caulked to the lower end of the outer envelope 7.

The force transmitting rigidity member 14 is a short cylindrical member enclosing the magnetic path member 12.

A flange 14a is formed on its upper end of the force transmitting rigidity member 14. A lower end of the force transmitting rigidity member 14 is coupled onto an upper surface of the yoke 10A constituting the electromagnetic actuator 10. Specifically, a lower end of the force transmitting rigidity member 14 is fitted into a circular groove formed along a peripheral edge of an upper end surface of the yoke 10A so as to be coupled together.

It is noted that a spring constant of the force transmitting member 14 during an elastic deformation thereof is set to be larger than the spring constant of the membrane-shaped elastic body 13.

In the first embodiment, a fluid member 15 is formed at a portion defined by a lower surface of the supporting elastic body 6 and an upper surface of the plate spring 11. A sub fluid chamber 16 is formed at a portion defined by the diaphragm 4 and recess 5a.

The orifice 5b formed by the orifice constituting member 5 provides means for communication between the fluid chamber 15 and the sub fluid chamber 16.

A fluid such as ethylene glycol is sealed within the fluid chamber 15, the sub fluid chamber 16, and the orifice 5b. A characteristic as a fluid mount determined according to a fluid path formation of the orifice 5b is adjusted to indicate a high dynamic spring constant and/or a high damping force when an engine shake occurs during a vehicular running state, vis., while the active engine mount 1 is vibrated over a frequency range from 5 Hz to 15 Hz.

The excitation coil 10B of the electromagnetic actuator 10 is so designed as to develop a predetermined electromagnetic force in response to the drive signal y supplied in a current form from a controller 25 via a wire harness.

Referring back to FIG. 1B, the controller 25 is constituted by a microcomputer having a CPU (Central Processing Unit), ROM (Read Only Memory), a RAM (Dandom Access Memory), an Input interface, an Output interface, the input and output interfaces including an amplifier (,e.g., voltage follower), an Analog-to-Digital Converter, and a Digital-to-analog converter.

In a case wherein an idling vibration enclosed sound vibration, enclosed sound vibration, or an acceleration vibration (a vibration developed when the vehicle is accelerated) is inputted to the vehicle body 35, the drive signal y is developed and outputted to the active engine mount 1 so as to develop the active supporting force which can reduce the vibration caused by the above-described engine individual vibrations.

The idling vibration and enclosed sound vibration are merely caused by, for example, a second-order component of an engine revolution in a case of a reciprocating, four-stroke, four-cylinder engine, the engine vibration in the second-order component of the engine revolution being transmitted toward the vehicle body 35.

It is, hence, possible to reduce the vibration at the side of the vehicle body 35 if the drive signal y in synchronization with the second-order component of the engine revolution being transmitted toward the vehicle body 35.

Hence, in the first embodiment, a pulsed signal generator 26 is installed which is synchronized with the revolution of a crankshaft of the engine 30 (for example, one whenever the crankshaft has revolved through 180° in the case of the reciprocating, four-stroke, four-cylinder engine). The reference signal x is supplied to the controller 25 as a signal representing a developed condition of the vibration in the engine 30.

A load sensor 22 for detecting a vibration force transmitted from the vehicular engine 30 toward the supporting elastic body 6 is disposed so as to be inserted between a lower end surface of the yoke 10A of the electromagnetic actuator 10 and an upper surface of a flat plate member 8a to form a bottom surface of the actuator casing 8. A result of detection by means of the load sensor 22 is supplied to the controller 25 in a form of a residual vibration signal e via a wire harness 23b. The load sensor 22 is constituted by, for example, a piezoelectric device, a magnetostrictive device, or a strain gauge.

The controller 25 executes a synchronous-type Filtered-X LMS (Least Mean Square) algorithm which is one of sequentially updating type adaptive algorithms on the basis of the supplied residual vibration signal e and the reference signal x. Consequently, the controller 25 is functionally provided with an adaptive digital filter W whose filter coefficients Wi (1=0, 1, 2, —, I-1; I denotes a number of tapes of the digital filter) are variable.

At an interval of predetermined sampling clocks when the latest reference signal x is inputted to the controller 25, the filter coefficients Wi of the adaptive digital filter are sequentially outputted as the drive signal y.

At the same time, the filter coefficients Wi of the adaptive digital filter W are appropriately updated on the basis of the reference signal x and the residual vibration signal e.

The updating equation of the adaptive digital filters W will be described in the following equation (1) in accordance with the filtered-X LMS algorithm.

$$Wi(n+1)=W(n)-\mu R^T e(n) \quad (1)$$

In the equation (1), a TERM attached with (n) or (n+1) denotes a value at one of the sampling time at (n) or (n+1) and $\mu$ denotes a convergence coefficient.

In addition, an updating reference signal $R^T$ is, theoretically, a value filtered by a transfer function filter C⁻ such that a transfer function C established between the electromagnetic actuator 10 of the active engine mount 1 and the load sensor 22 is modeled in a finite impulse response type filter.

Since a level of the reference signal X is at a "1", the term of $R^T$ coincides with the impulse responses of the transfer function filter C⁻ are sequentially generated in synchronization with the reference signal x.

Theoretically, the drive signal y is developed with the reference signal x filtered by means of the adaptive digital filter W. Then, since the level of the reference signal x is at the "1", the same result is obtained as the result of the filtering process which indicates the drive signal y even when the filter coefficients Wi are sequentially outputted as the drive signal y.

Furthermore, the controller 25 executes the vibration reducing processing using the adaptive digital filter described above and the identification processing of the transfer function C required for the vibration reduction control is executed.

That is to say, since the controller 25 is provided with an identification processing start switch 28 operated at a timing at which the identification processing of the transfer function C is started.

For example, when at a final process in the manufacturing line of the vehicle or when a regular check at a car dealer, an operator operates the identification process start switch 28 so that the identification processing of the transfer function C is executed within the controller 25. It is noted that during the identification processing of the transfer function, the normal vibration reduction processing is not executed.

That is to say, the controller 25 executes the vibration reduction processing in accordance with the synchronous type filtered-X LMS (Least Mean Square) algorithm while the vehicle is running with a vehicular ignition key switch turned on. It is noted however that when the identification processing start switch 28 is turned to ON (becomes active), the controller 25 halts the vibration reduction processing but executes the identification processing of the transfer function C.

In the first embodiment, the identification processing of the transfer function C is carried out using the identification signal in a sinusoidal waveform.

Specifically, the data read processing such that the identification signal in the sinusoidal waveform is continued to be outputted for a predetermined period of time to the active engine mount 1 in place of the drive signal y and the residual vibration signal e is read is repeatedly executed, sequentially changing the frequency of the identification signal.

Next, each time series data of the residual vibration signal e obtained by a corresponding one of each data read processing is processed under an FFT (Fast Fourier Transform) processing to extract a component corresponding to the frequency of the identification signal.

The result of synthesizing extracted each frequency component is under an inverse FFT processing to derive an impulse response as the transfer function C.

The derived impulse response is enabled to be replaced with the latest transfer function filter C⁻ as a finite impulse response type transfer function filter C⁻.

It is noted that the frequency fo of the identification signal is set to a minimum value (fo=fmin, in this embodiment, fmin=10 Hz) when the identification process is incremented by a predetermined increment $\Delta f$ (in this embodiment, $\Delta f$=10 Hz) until the incremented frequency has reached to a maximum value fmax (in this embodiment, fmax=150 Hz).

It is noted that the frequency fo of the identification signal is incremented by half ($\Delta f/2$) of the predetermined increment $\Delta f$, exceptionally, when the frequency fo exceeds a minimum value $f_L$ in a predetermined frequency band and has reached to a maximum value $f_U$.

In details, the frequency fo of the identification signal is selected with a relatively narrow frequency interval within a predetermined frequency band ($f_U$–$f_L$) and is selected with a relatively wide frequency interval within a predetermined frequency band (fmin through $f_U$ and $f_L$ through fmax).

In the first embodiment, a predetermined frequency band is set to 20 through 80 Hz.

A resonant phenomenon continuously appears on the engine supporting system which is a controlled system within the frequency band.

That is to say, since continual resonance peaks appear in a vicinity to 50 Hz at which a resonance of a suspension member system appears and in an approximate range between 20 Hz and 30 Hz on which a bend resonance of each of the engine mount characteristic and the vehicle body 35 gives a remarkable influence, the predetermined frequency band ($f_U$ through $f_L$) is set between 20 Hz and 80 Hz with a frequency margin taken into consideration.

As described above, the inverse FFT processing derives the impulse response as the transfer function. However, to cope with an inconvenience that the frequency interval of the selected identification signal is different between those of the predetermined frequency band and of the other frequency bands, an interpolation of each frequency component of the identification signal is carried out before the inverse FFT processing so that the interval of the frequency components is set to be constant.

Specifically, for the frequency components in the other frequency bands, an average value of each mutually adjacent frequency component is derived and the derived average value is the frequency component placed between these two mutually adjacent frequency components.

Next, the operation of the actively vibration reducing control apparatus in the first embodiment will be described below.

When the engine shake occurs, the active engine mount 1 functions as a supporting device having the high dynamic spring constant and the high damping force since the flow passage formation of the orifice 5a has properly been selected.

Hence, the engine shake developed on the vehicular engine 30 is damped by means of the active engine mount 1 and the vibration level on the vehicle body side 35 is accordingly reduced.

It is not necessary to displace positively the movable plate 12 against the engine shake.

In details, when the engine shake occurs, a flow passage shape of the orifice 5b is properly selected.

As the result of this, the active engine mount 1 shown in FIGS. 1A and 2 functions as a supporting device having the high dynamic spring constant and the high damping force since the flow passage function of the orifice 5a has properly been selected.

Hence, the engine shake developed on the vehicular engine 30 is damped by means of the active engine mount 1 and the vibration level on the vehicle body side 35 is accordingly reduced.

It is not necessary to displace positively the movable plate 12 against the engine shake.

In a case where the vibration having the frequency equal to or higher than the engine idling vibration frequency such that the fluid within the orifice 5a becomes sticky and it becomes possible for the communication of the fluid between the fluid chamber 15 and the sub fluid chamber 16 is inputted, the controller 25 executes a predetermined arithmetic and/or logic operation and outputs the drive signal y to the electromagnetic actuator 10, and develops the active supporting force capable of reducing the vibration on the active engine mount 1.

The above-described predetermined arithmetic and/or logic operation executed in the controller 25 during the input of the engine idling vibration or of the enclosed sound vibration will be described with reference to FIG. 3.

Figure 3:
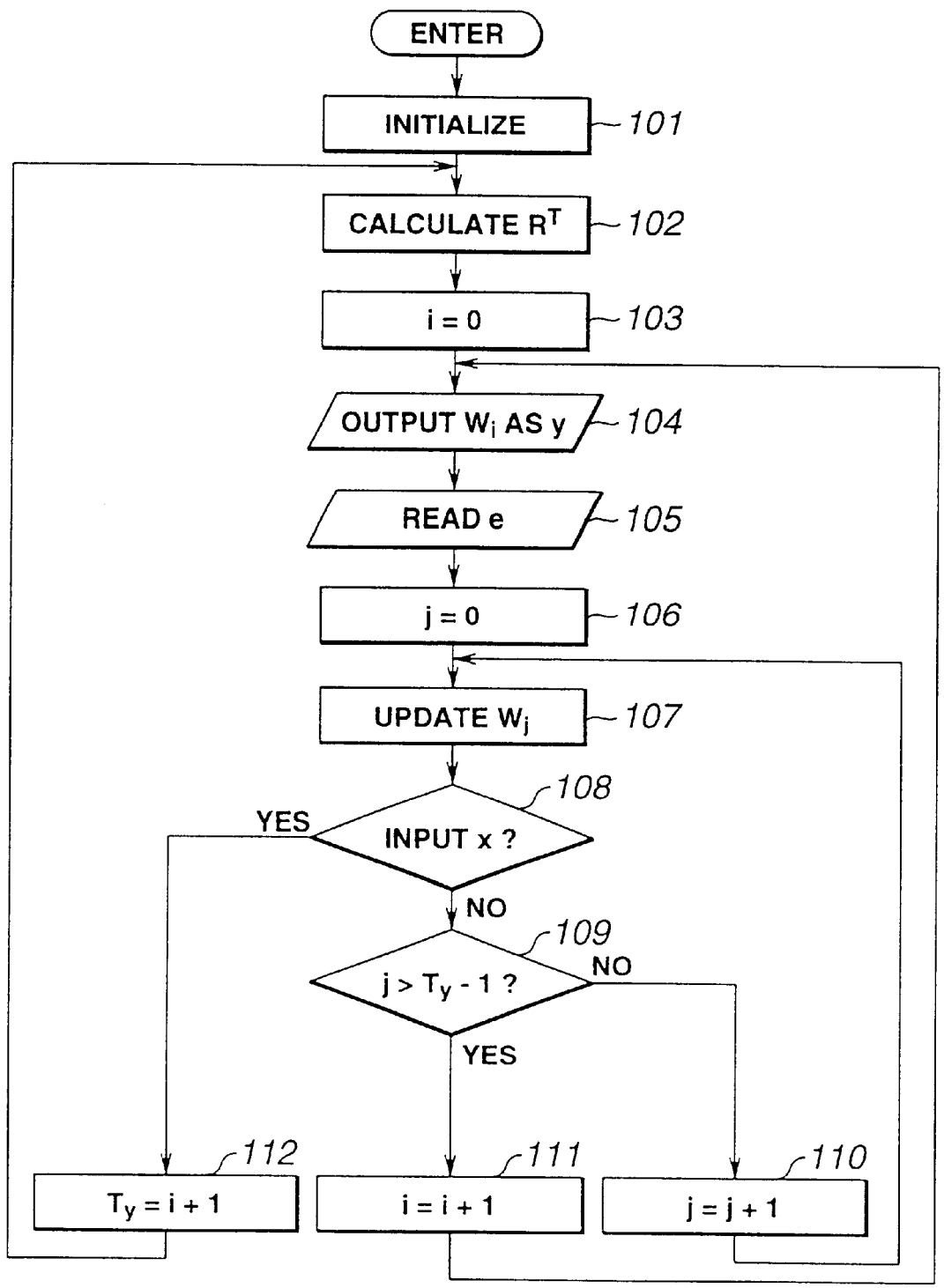
FIG. 3 is a flowchart for explaining a general operation of a vibration reduction process in the first embodiment shown in FIG. 1A.

FIG. 3 shows a flowchart of the vibration reduction control executed in the controller 25 shown in FIG. 1A.

It is noted that the enclosed sound vibration means a kind of vibration such that the engine 30 is revolved from a low speed toward a high speed during the vehicle started to run and the engine vibration is sounded on a vehicular compartment.

At a first step 101, the CPU of the controller 25 is cleared to zero a counter 1.

Therefore, the routine goes to a step 104 in which a filter coefficient Wi of the i-th number in the adaptive digital filter W is outputted as the drive signal.

At a step 104, the CPU of the controller 25 outputs the drive signal y.

At a step 105, the CPU of the controller 25 reads the residual vibration signal e.

At a step 106, another counter j is cleared to zero and the routine goes to a step 107. The filter coefficient Wj of the j-th number in the adaptive digital filter W is updated in accordance with the equation (1).

Upon the completion of the updating processing at the step 107, the routine goes to a step 108 in which the CPU of the controller 25 determines whether the subsequent reference signal x is inputted. If no subsequent reference signal x is inputted, the routine goes to a step 109 in order to execute an updating of the subsequent filter coefficient of the adaptive digital filter or to execute the output processing of the drive signal y.

At a step 109, the CPU of the controller 25 determines whether the counter j has reached to the number of times Ty (Accurately, a value of the output number of times Ty subtracted by one in order to start the counter j from zero (j>Ty−1). This determination is based on whether the filter coefficients Wi of the adaptive digital filter W is outputted as the drive signal y. If No at the step 109, the routine goes to a step 110 in which the counter j is incremented (j=j+1) and, thereafter, the routine returns to the step 107 in which the above-described processing is repeated.

However, if "Yes" at the step 109, the routine goes to a step 112 in which the counter i (More particularly, a value of the counter i added by one in order to start the counter i from zero) is started at the latest output number of times Ty. Then, the routine returns to the step 102 in which the above-described processing is repeated and executed.

After the processing of FIG. 3 is repeatedly executed. The filter coefficients Wi of the adaptive digital filter are sequentially supplied to the electromagnetic actuator 10 as the drive signal y at the interval of the sampling clock from a time point at which the reference signal x is inputted.

As a result of this, although one magnetic force according to the drive signal y is developed on the excitation coil 10B, a constant magnetic force is given from the permanent magnet 10C to the magnetic path member 12 so that the magnetic force by means of the excitation coil 10B may be acted upon the magnetic force on the permanent magnet 10C. When no drive signal y is supplied to the excitation coil 10B, the magnetic path member 12 is displaced at a neutral position at which the supporting force by means of the spring force 11 is balanced to the magnetic force of the permanent magnet 10C. In this neutral state, when the drive signal y is supplied to the excitation coil 10B, the magnetic force developed on the excitation coil 10B is opposite to the magnetic force of the permanent magnet 10C. At this time, the magnetic path member 12 is displaced in the direction such that the clearance against the electromagnetic actuator 10 is incremented. On the contrary, if the direction of the magnetic force developed on the excitation coil 10B is the same as that of the magnetic force of the permanent magnet 10C, the magnetic path member 12 is displaced in a direction such that the clearance against the electromagnetic actuator 10 is decreased.

Since the magnetic path member 12 is displaceable in both normal and reverse directions, the volume of the main fluid chamber 15 is varied if the magnetic path member 12 is displaced. Since the vibration in the volume causes an expansion spring of the supporting elastic body 6 due to its volume variation to the varied, the active supporting force in both of the normal and reverse directions is developed on the active engine mount 1.

Each filter coefficient Wi of the adaptive digital filter W which serves as the drive signal y is sequentially updated using the above equation (1) in accordance with the synchronous-type Filtered-X LMS algorithm. Hence, after each filter coefficient Wi of the adaptive digital filter W is converged into an optimum value upon an elapse of a certain period of time, the drive signal y is supplied to the active engine mount 1. Consequently, the idling vibration and/or enclosed sound vibration transmitted from the engine 30 toward the active engine mount 1 can be reduced.

The operation of the vibration reduction processing to be executed during the vehicular running condition has been described with reference to FIG. 3.

On the other hand, the identification process before the vehicle is under shipment when the operator turns the identification process start switch 28 to ON.

That is to say, when the identification process of the transfer function C is started, the CPU 25A of the controller 25 sets, at a step 201, the frequency fo of the identification signal to the minimum value fmin (in this embodiment, 10 Hz) from among the frequency band (fmin through fmax) in which the vibration reduction control is executed which is required to execute the identification processing.

Thus, the routine goes to a step 202 in which the sinusoidal wave with the frequency of fo is supplied to the active engine mount 1 as the identification signal.

At this time, the electromagnetic actuator 10 within the active engine mount 1 is driven by means of the identification signal to develop the identification vibration so that the identification vibration is transmitted to the weight sensor 22 via each member.

At a step 203, the CPU of the controller 25 reads the residual vibration signal e.

At a step 204, the CPU of the controller 25 determines whether sufficient numbers of residual vibration signals e have been read (e+).

It is noted that a value set as the sufficient numbers of the residual vibration signals may be equal to or above a quotient of a time required for the impulse response to be sufficiently damped divided by a sampling clock since the transfer function C can be derived as the impulse response.

However, it is desirable for the read numbers of the residual vibration signals e to be set to a power of 2 ($2^n$, n=arbitrary integer) since the FFT calculation is carried out after a time series residual vibration signal e is read.

In addition, it is desirable for the value set as the sufficient numbers of the residual vibration signals e to be a minimum value from among the numerical values of the power of 2 exceeding the quotient of the time required for the impulse response to be sufficiently damped divided by the sampling clock since, if extremely large numbers of the residual vibration signals e were read, the time required to read this extremely large number of the residual vibration signals e would become long and the time required for the FFT calculation becomes long.

For example, if the sampling clock has a period of 2 milliseconds and the time required for the impulse response to be sufficiently damped is 0.2 milliseconds, 0.2 (seconds)/2 (milliseconds)=100.

Hence, the set value at the step 204 is 128.

Figure 4:
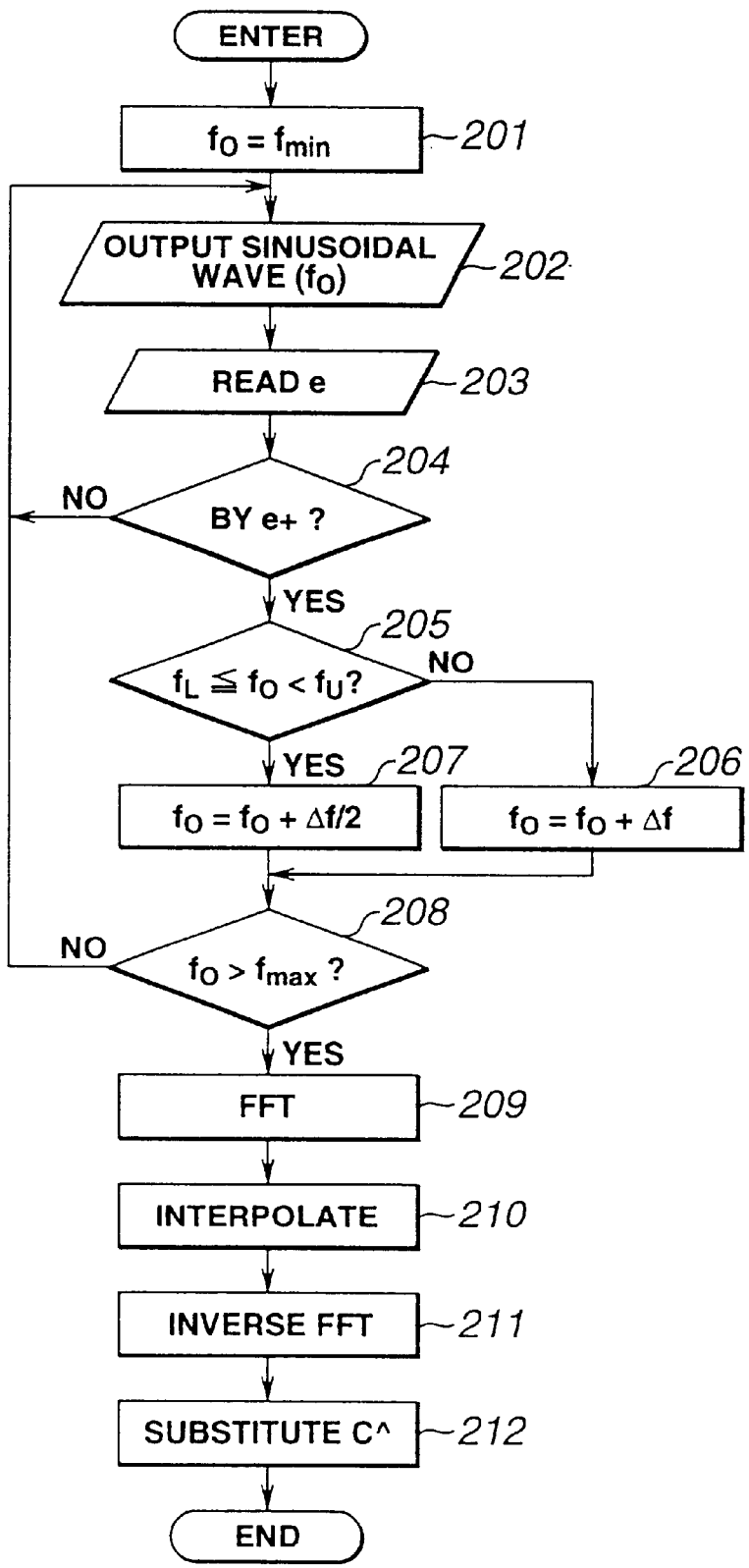
FIG. 4 is a flowchart for explaining a general operation of an identification process of a transfer function in the first embodiment shown in FIG. 1A.

Referring back of the step 224 of FIG. 4, if the determination at the step 204 is "NO", the routine returns to the step 202 to repeat the output processing of the identification signal at the step 202 and the read processing of the residual vibration signal e (step 203) is repeated.

If "YES" at the step 204, the routine goes to a step 205.

At the step 205, the CPU of the controller 25 determines whether the present frequency fo falls in a range, the range being equal to or above the minimum value $f_L$ of the predetermined frequency band and being below the maximum value $f_U$ ($f_L \leq fo < fu$).

If the determination at the step 205 is "NO", the routine goes to a step 206 in which an increment Δf is added to the present frequency fo (fo=fo+Δf) so as to derive a new frequency fo.

On the other hand, if the determination of the step 205 is "YES", the routine goes to a step 207 in which the half (Δf/2) of the increment Δf is added to the present frequency fo to calculate the new frequency fo.

Next, at a step 208, the CPU of the controller 25 determines whether the new frequency fo exceeds the maximum value fmax of the frequency used to carry out the identification processing.

If "NO" at the step 208, the routine returns to the step 202 to repeat the same processes.

Hence, the series of processing from the step 202 to the step 207 is executed until the determination at the step 208 gives "YES".

In details, the series of processes at the steps 202 and 203 are executed for the frequency fo varying by the increment Δf or by the half of the increment Δf (Δf/2) in the range from fmin to fmax.

If the step 208 indicates "YES", the redidual vibration signal e stored as the time series data at the process of the step 203 has the same number as kinds of the frequency fo.

If the determination of the step 208 is "YES", the routine goes to a step 209 in which the FFT calculation is made for the respective time series data on the residual vibration signal e stored for each frequency fo to extract frequency components from the respective time series data.

It is, however, noted that the required frequency component is not the frequency components of all frequencies for each time series data but only the components corresponding to the frequency of the original sinusoidal wave determined according to the corresponding frequency fo.

Hence, at the step 209, a strict FFT calculation to each time series data is not carried out but the calculation sufficient to derive the frequency component of the frequency fo corresponding to each time series may be carried out.

Then, at a step 210, the CPU of the controller 25 executes an interpolation calculation based on the respective frequency components derived at step 209 so as to make the frequency intervals between each frequency component uniform.

Specifically, a selection interval when the frequency fo of the identification signal falls within the predetermined frequency band $f_L$ through $f_U$ is Δf/2 and the selection interval when the frequency fo falls within the other frequency band is Δf.

Hence, an average value of the mutually adjacent two frequency components is calculated from among the respective frequency components derived for the frequency band in which the selection interval is Δf and the average value is the frequency component between these two frequency components.

Then, the routine goes to a step 211 in which the CPU of the controller 25 calculates an inverse FFT for each frequency component whose frequency interval becomes uniform through the interpolation. While the inverse FFT calculation causes each frequency component to be converted into the impulse response on a time axis.

At a step 212, the CPU of the controller 25 stores the impulse response derived at the step 211 as a new transfer function filter C⁻.

Upon the completion of the storage of the transfer function filter C⁻, the identification processing of the present transfer function C shown in FIG. 4 is ended.

In the first embodiment, the transfer function C is identified at an arbitrary timing after the active engine mount 1 and the controller 25 have actually been mounted and the transfer function filter C⁻ is substituted by the identified transfer function C.

Hence, as compared with a case where the transfer function C derived in an experimental room is applied to all vehicles, the transfer function filter C⁻ having a high accuracy can be used for the vibration reduction control and the identification of the transfer function C for each regular check can cope with a variation in the vibration transmission system due to an aging effect on each assembly part. Thus, a preferable vibration reduction control can be achieved.

Although the transfer function C can be achieved even when the identification signal, for example, of the white noise is developed, the output of the identification vibration is dispersed over a wide frequency band as denoted by a broken line of FIG. 6 when the white noise signal is supplied to the electromagnetic actuator 10 to generate the identification vibration.

Therefore, to obtain the transfer function with high accuracy, an adaptive calculation based on the identification vibration developed from the white noise signal needs to be carried out over a relatively long time.

Figure 5:
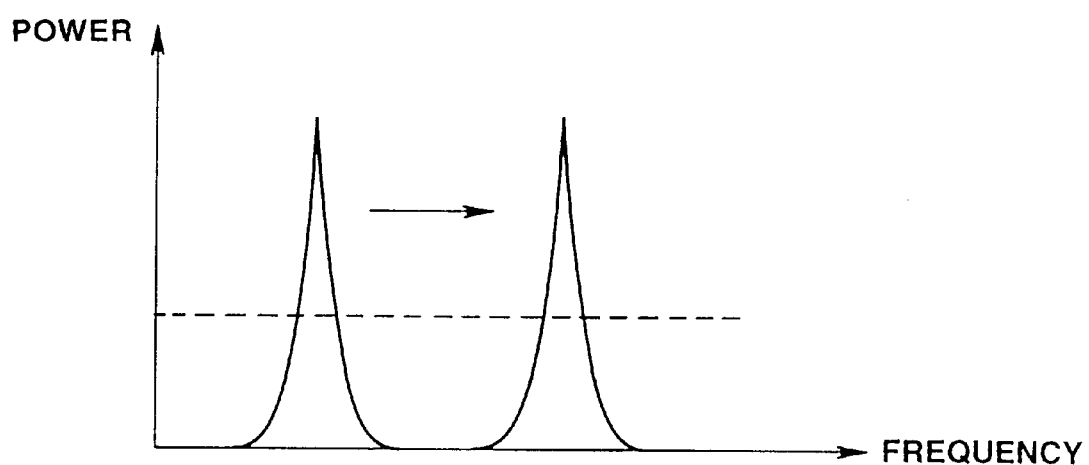
FIG. 5 is a frequency characteristic graph for explaining a difference between cases where a sinusoidal wave is used for an identification signal and where a white noise signal is used for the identification signal.

In the first embodiment using the identification signal generated on the basis of the sinusoidal wave, the output of the identification vibration is concentrated over a particular frequency as denoted by a solid line of FIG. 5.

Consequently, the whole calculation time duration becomes not only be shortened for each individual frequency but becomes shortened as compared with the case where the identification using the white noise is carried out.

Consequently, the identification of the transfer function C can be made in a relatively short period of time even in a case where the controller 25 with a relatively low calculation capability and the calculation period is used.

Hence, even in a case where the identification process of the transfer function C is carried out with the identification process start switch 28 operated in the last process of the manufacturing line, a large influence of the identification process is given on the manufacturing line speed is not given. Even when the identification process start switch 28 is operated for each regular check at the car sales dealer to carry out the identification process of the white noise signal, a large augument the operation time can be avoided.

In the first embodiment, since the frequency of the sinusoidal waveform as the identification signal during the identification process of the transfer function C is selected with a wide interval (Δf) in the other frequency band than the predetermined frequency band, the identification of the transfer function C can be carried out with the high accuracy, the increase in the calculation band suppressed at minimum.

Figure 6A:
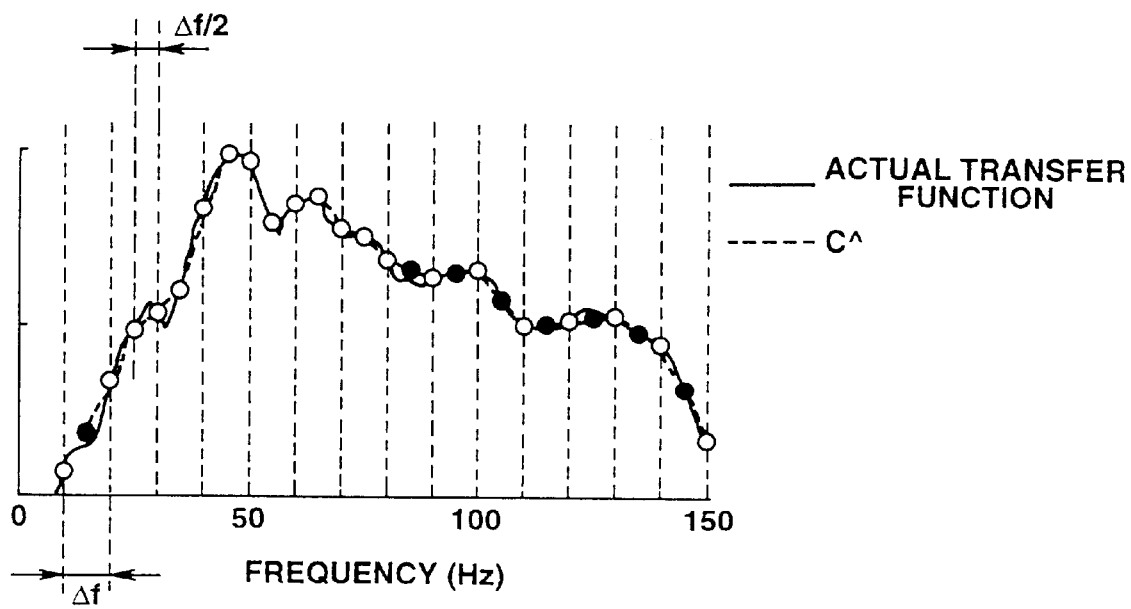
FIGS. 6A and 6B are frequency characteristic graphs for explaining operation and advantage in the actively vibration reducing control apparatus in the first embodiment shown in FIG. 1A.

In details, as shown by a gain characteristic of FIG. 6A, minute resonance peaks appear on the actual transfer function of the vibration transmission system in the first embodiment between 20 Hz and 80 Hz. However, since the frequency of the identification signal is selected with the fine interval (Δf/2) in the frequency band (20 through 80 Hz), the transfer function C can be represented with the high accuracy in the transfer function filter C⁻.

In addition, the frequency of the identification signal is selected with the wide interval (Δf) and the frequency components between each wide interval (Δf) is derived through the interpolation calculation (white marks in FIG. 6A denote respective frequency components actually measured using the identification signal and black marks in FIG. 6A denote the frequency components estimated by means of the interpolation).

However, since the minute resonance peaks doe not appear on the other frequency band, the transfer function can highly accurately be represented even when the frequency components are included partially in those derived through the interpolation calculation.

Figure 6B:
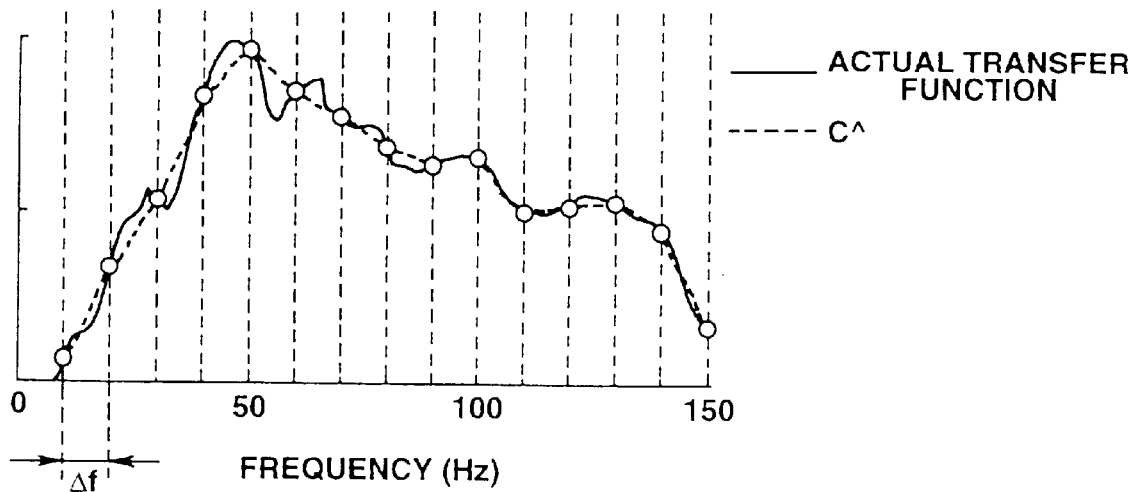

On the other hand, as shown by the gain characteristic of FIG. 6B, the selection interval of the frequency of the identification signal is fixed to Δf.

In this case, it is not possible to represent with the high accuracy the actual transfer function by the transfer function filter C⁻. On the contrary, if the interval Δf itself becomes finer, the load on the identification process is remarkably increased and the time to carry out the identification processes in the short period of time cannot be achieved.

Since the interpolation is carried out before the inverse FFT process is executed so that the interval of each frequency component can be made uniform, the FFT processing can be carried out without a special trouble to derive the transfer function filter C⁻.

FIGS. 7 through 10 show a second preferred embodiment of the actively vibration reducing control apparatus according to the present invention.

Figure 7:
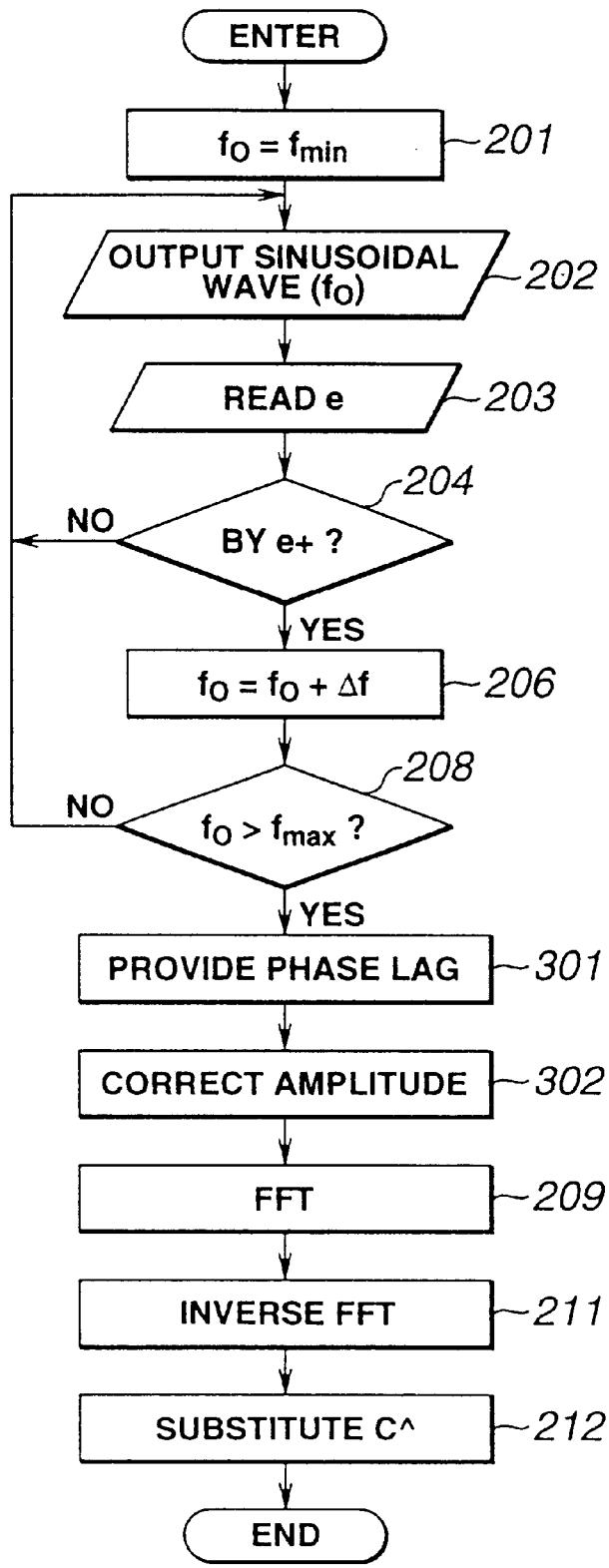
FIG. 7 is an operational flowchart for explaining the identification process executed in the actively vibration reducing apparatus in a second preferred embodiment.

FIG. 7 shows a flowchart representing the concept of the identification process executed by the controller 25 in the same way as FIG. 4 described in the first embodiment. The other structure of the actively vibration reducing control apparatus in the second embodiment is the same as that described in the first embodiment.

First Embodiment

In details, in the second embodiment, when the determination that fo>fmax (YES) is made at the step 208, the routine goes to a step (step 301) at which a phase delay is provided for each time series of the residual vibration signals e derived at the data processing and to a step (step 302) at which an amplitude of each time series of the phase delay provided in the residual vibration signals e.

The phase lag (delay) processing at the step 301 is a processing such that the phase lag corresponding to the half time (To/2) of the period To of the sampling clock is provided for each time series of the residual vibration signals e achieved through the data read processing.

Specifically, to which degree of phase of the frequency of each identification signal corresponding to one of respective time series of the residual vibration signals e the time (To/2) corresponds is derived or previously derived.

Thereafter, the sets of time series of the residual vibration signal e are processed by means of the filter having the characteristic such as to provide the delay corresponding to the phase so that the phase delay corresponding to the time (To/2) is provided for each time series.

Figure 8A:
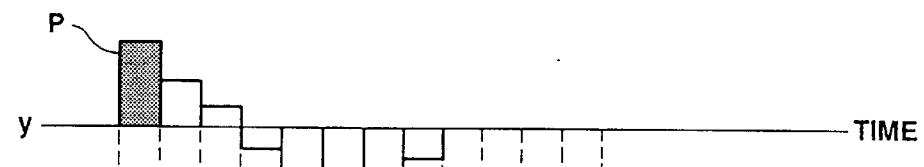
FIGS. 8A, 8B and 8c are waveform charts for explaining a response to a rectangular wave and a theoretical impulse response.

It is noted that, in the vibration reduction processing shown in FIG. 3 and executed in synchronization with the sampling clock, the drive signal y is actually constituted by rectangular waveform continued signals, each having a time width of To which corresponds to the period of the sampling clock as shown in FIG. 8A.

It is desirable that the impulse response between the active engine mount 1 as the control vibration source and the weight sensor 22 as the residual vibration detector is the response when the rectangular wave having the width of the period of To is deemed to be an impulse.

Figure 8B:
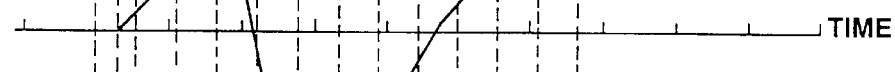

FIG. 8B shows a waveform of the response to the impulse as described above.

Figure 8C:
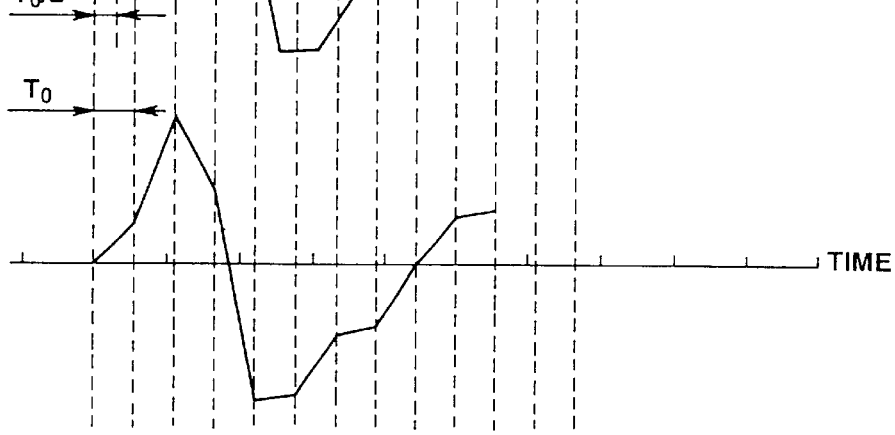

On the other hand, the waveform of the response to a theoretical impulse is shown in FIG. 8C since the theoretical impulse is such a pulse having no time width as denoted by P in FIG. 8A.

With the phase characteristics between the waveform shown in FIG. 8B and that shown in FIG. 8C taken into consideration, a phase advance (phase lead) corresponding to the time (To/2) with respect to the waveform of FIG. 8B is provided for the waveform shown in FIG. 8C.

In other words, the waveform shown in FIG. 8B corresponding to the transfer function filter C⁻ which is preferable to the vibration reduction control has the phase lag (phase delay) corresponding to the time (To/2) with respect to the waveform shown in FIG. 8C corresponding to the transfer function measured using the sinusoidal wave as the identification signal.

Since such a phase lag as described above indicates a constant value in a time domain, the phase lag tends to become gradually increased as the frequency of the identification signal becomes higher.

Figure 9:
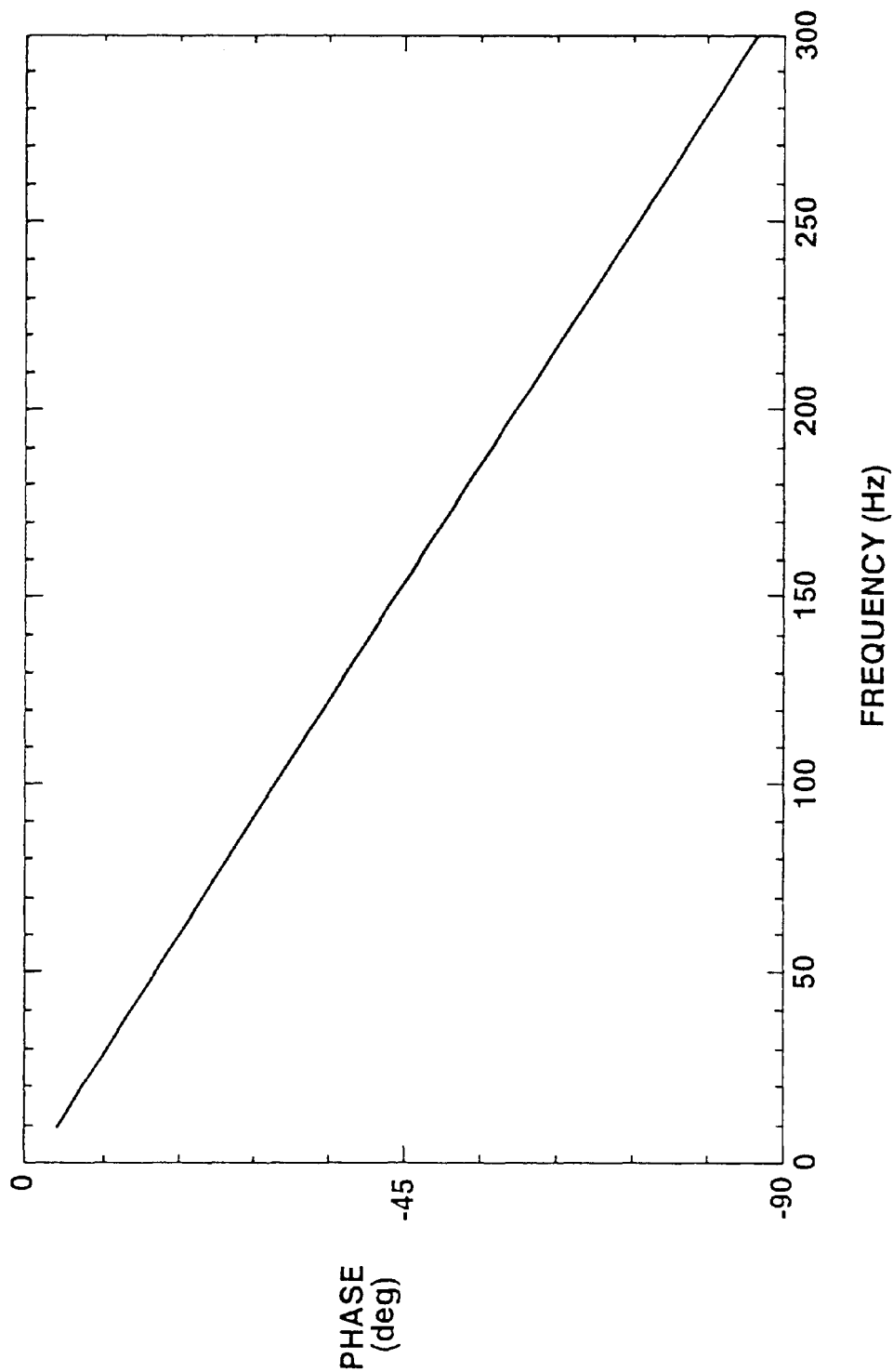
FIG. 9 is a characteristic graph representing one example of a phase characteristic difference.

Therefore, such a phase lag as shown in FIG. 9 is provided at the step 301 for each time series of the residual vibration signal e according to the frequency of the corresponding identification signal.

Consequently, the phase lag for each frequency is provided to the impulse response derived according to the inverse FFT processing at the step 211 and the accuracy of the phase characteristic of the transfer function C⁻ can be improved.

On the other hand, the amplitude correction processing at the step 320 of FIG. 7 is a processing such that the amplitude of each time series of the residual vibration signal e for which the phase lag is provided at the step 301 is reduced so that as the frequency of the corresponding identification signal becomes high, a reduction width becomes wide.

That is to say, the phase difference shown in FIGS. 8B and 8C is present between the transfer function filter C⁻ preferable to the vibration reduction control and the transfer function measured using the sinusoidal wave as the identification signal.

In addition, in the gain characteristic between both waveforms shown in FIGS. 8B and 8C, the difference according to the period To (width of the rectangular wave) of the sampling clock is present.

Figure 10:
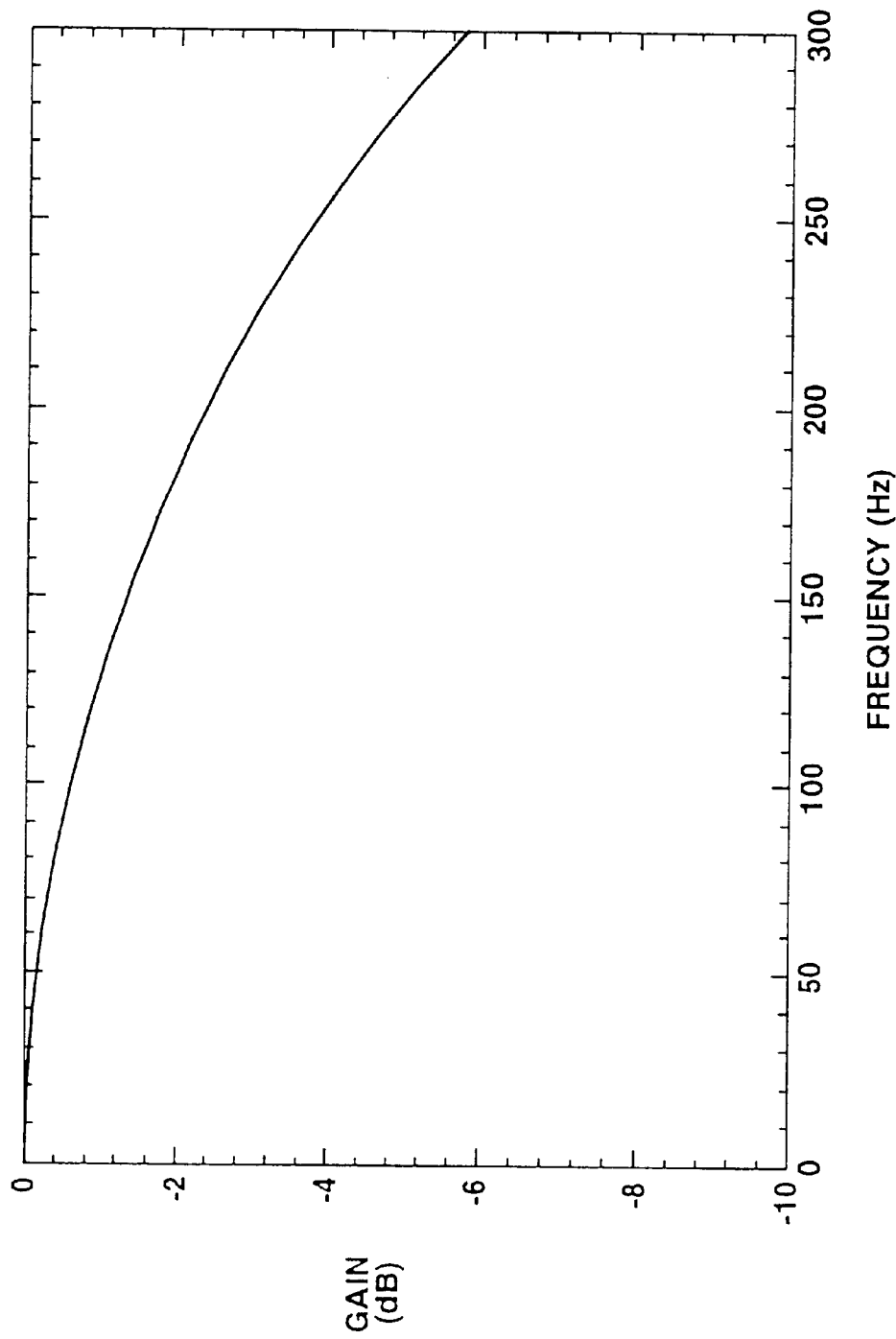
FIG. 10 is a characteristic graph representing one example of a gain characteristic difference.

Specifically, the gain characteristic of the transfer function filter C⁻ preferable to the vibration reduction control with respect to that of the transfer function measured using the sinusoidal wave as the identification signal is such that the reduction width becomes large as the frequency becomes high as shown in FIG. 10.

The gain characteristic as shown in FIG. 10 is determined on the basis of the period To of the sampling clock and can previously be derived through a simulation.

The gain characteristic is corrected in a tendency as shown in FIG. 10 according to the frequency of the corresponding identification signal at the step 302 for each time series of the residual vibration signal e which the phase lag is provided at the step 301.

Consequently, the gain characteristic of the impulse response achieved by the inverse FFT processing at the step 211 is corrected for each frequency and the accuracy of the transfer function filter C⁻ can be improved.

As described above, in the second embodiment, since both of the phase characteristic and gain characteristic of the transfer function filter C⁻ can be more highly accurate, the more preferable vibration reduction control can be achieved.

Third Embodiment

Figure 11:
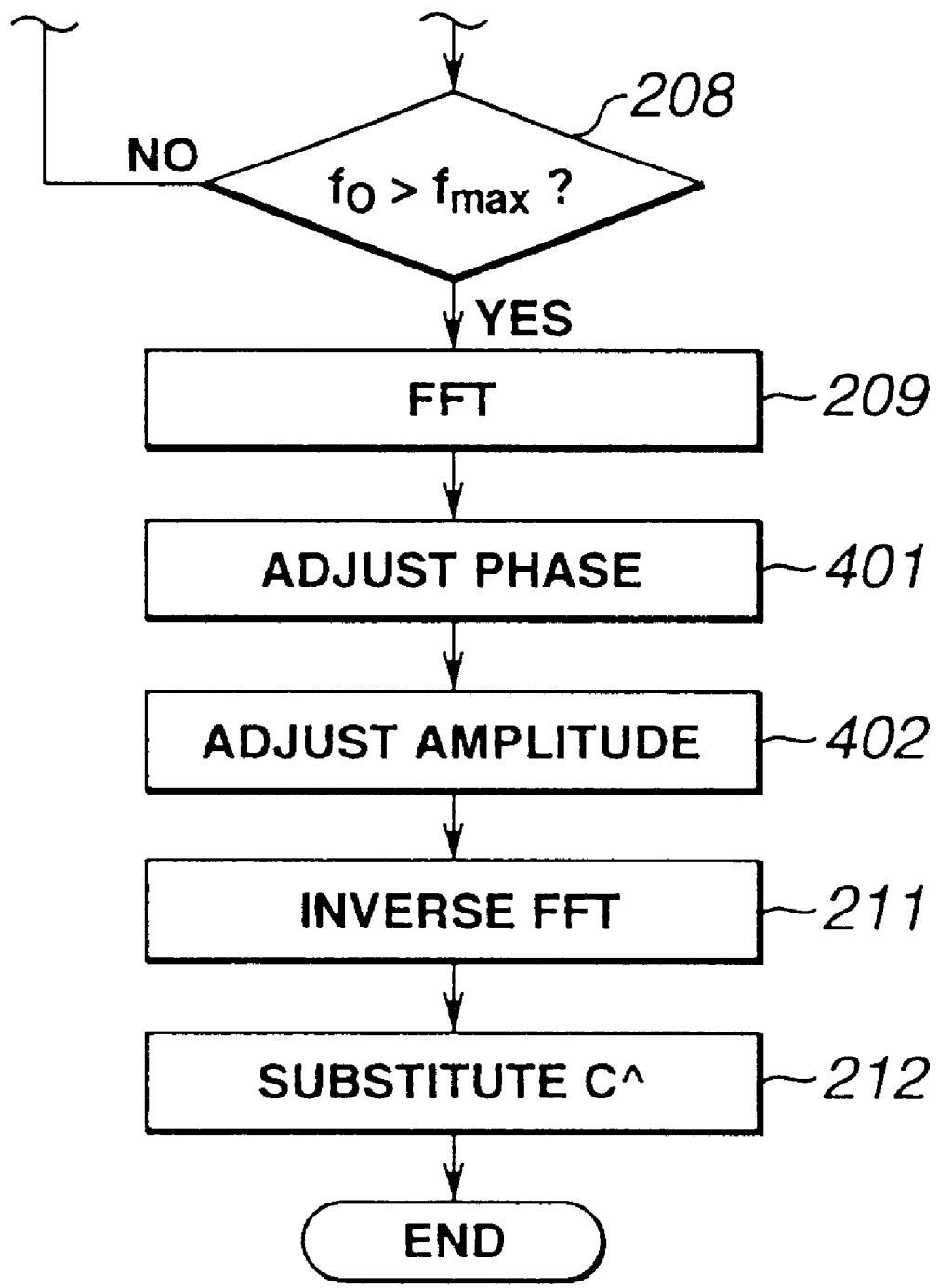
FIG. 11 is an operational flowchart for explaining a part of the identification process of a transfer function in a case of a third preferred embodiment of the actively vibration reducing apparatus.
Figure 12:
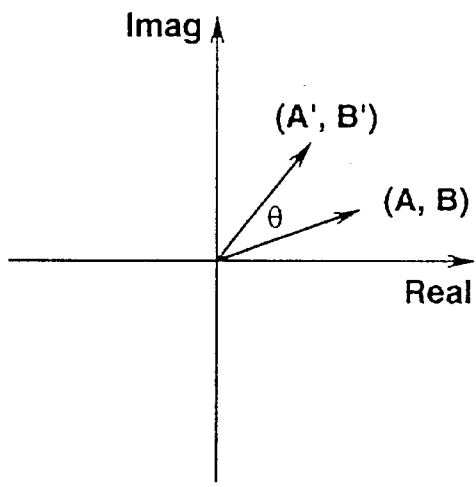
FIG. 12 is an explanatory view of a calculation for providing a phase lag for a result of an FET processing.

FIGS. 11 and 12 show a third preferred embodiment of the actively vibration reduction control apparatus.

FIG. 11 shows a flowchart indicating a part of the identification processing of the transfer function.

The other steps than those shown in FIG. 11 are the same as those shown in FIG. 4.

The other structure is the same as that described in the first embodiment.

In the third embodiment, the predetermined phase delay (lag) is provided at a step 401 for each frequency component as the result of the FFT processing at the step 209 without execution of the phase delay processing and amplitude adjustment processing for each time series of the residual vibration signal e as described in the second embodiment.

At a step 402, the level of each frequency component is reduced so that the amplitude for each frequency component of the transfer function is adjusted.

In other words, the calculation to give the phase lag θ to a real part A and imaginary part B of the frequency component for each frequency derived through the FFT processing at the step 209 is as follows:

$$\begin{bmatrix} A' \\ B' \end{bmatrix} = \begin{bmatrix} \cos\theta & -\sin\theta \\ \sin\theta & \cos\theta \end{bmatrix} \begin{bmatrix} A \\ B \end{bmatrix}. \quad (2)$$

The real part A and the imaginary part B of each frequency component is converted into the real part A' and the imaginary part B', for example, as sown in FIG. 12.

The phase delay θ can be derived through a look-up technique with reference to a table, for example, shown in FIG. 9 in the same way as the second embodiment.

Consequently, the accuracy of the phase characteristic of the transfer function filter C⁻ can be improved.

The level of each frequency component for which the phase characteristic is provided at the step 401 is reduced by referring to a table such as shown in FIG. 10 at a step 402 of FIG. 11.

Consequently, the gain characteristic of the impulse response achieved through the inverse FFT processing a the step 211 is corrected for each frequency and the accuracy of the gain characteristic of the transfer function filter C⁻ can be improved.

The same result and advantage as those described in the second embodiment can be achieved in the third embodiment.

Fourth Embodiment

Figure 13:
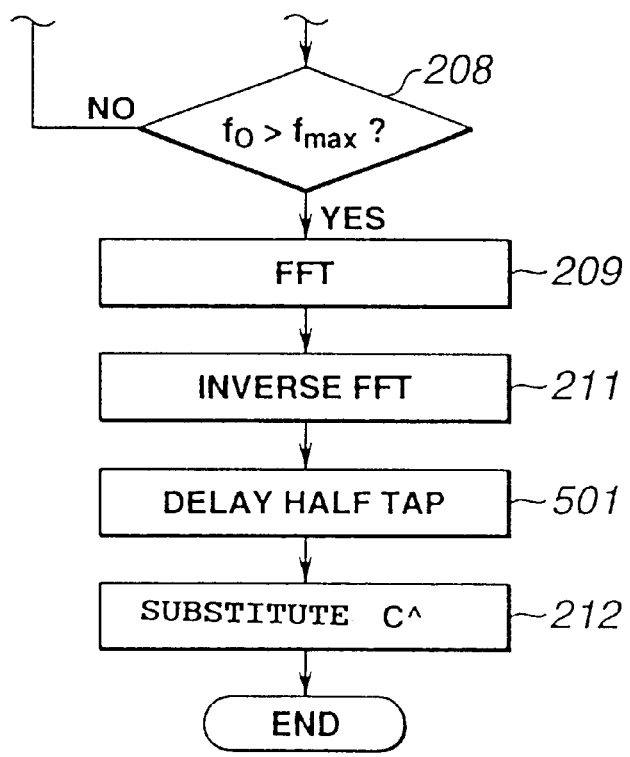
FIG. 13 is an operational flowchart for explaining a part of the identification process of the transfer function in the case of a fourth preferred embodiment of the actively vibration reducing apparatus according to the present invention.

FIGS. 13, 14A, and 14B show a fourth preferred embodiment of the actively vibration reducing control apparatus according to the present invention.

FIG. 13 shows a part of a flowchart representing the identification processing executed in the case of the fourth embodiment.

The other structure of he fourth embodiment is the same as that described in the first embodiment.

That is to say, in the fourth embodiment, the impulse response derived through the inverse FFT processing at the step 210 (transfer function filter C⁻) is delayed by a half tap (To/2) at a step 501 to derive he transfer function filter C⁻'.

This is different from the technique described in each of the second and third embodiments.

The new transfer function filter C⁻' is used as the transfer function filter C⁻ of the vibration reduction control.

Specifically, the routine goes from the step 210 to the step 501 in which the transfer function filter C⁻ is delayed by the half tap on the basis of the following equation to calculate the new transfer function C⁻'.

$$C^{-'}{}_o=0; \text{ and } C^{-'}i=(C^-(i-1)+C^-i)/2.$$

In details, the transfer function filter C⁻ as shown in FIG. 14A us delayed by the half tap to provide the transfer function filter C⁻' as shown in FIG. 14B. Then, the transfer function filter C⁻' as shown in FIG. 14B is substituted by the transfer function filter C⁻ for the vibration reduction control at the step 212.

Since, in the fourth embodiment, the phase delay (lag) for each frequency component is not provided as is different form the case of each of the second and third embodiments, the accuracy becomes lowered to some degree but the phase characteristic of the transfer function becomes sufficiently high as compared with the case where no phase delay is provided.

In addition, since the calculation becomes easy as compared with the provision of the phase delay for each frequency component, the increase in the calculation load of the controller 25 can be suppressed.

Fifth Embodiment

Figure 15:
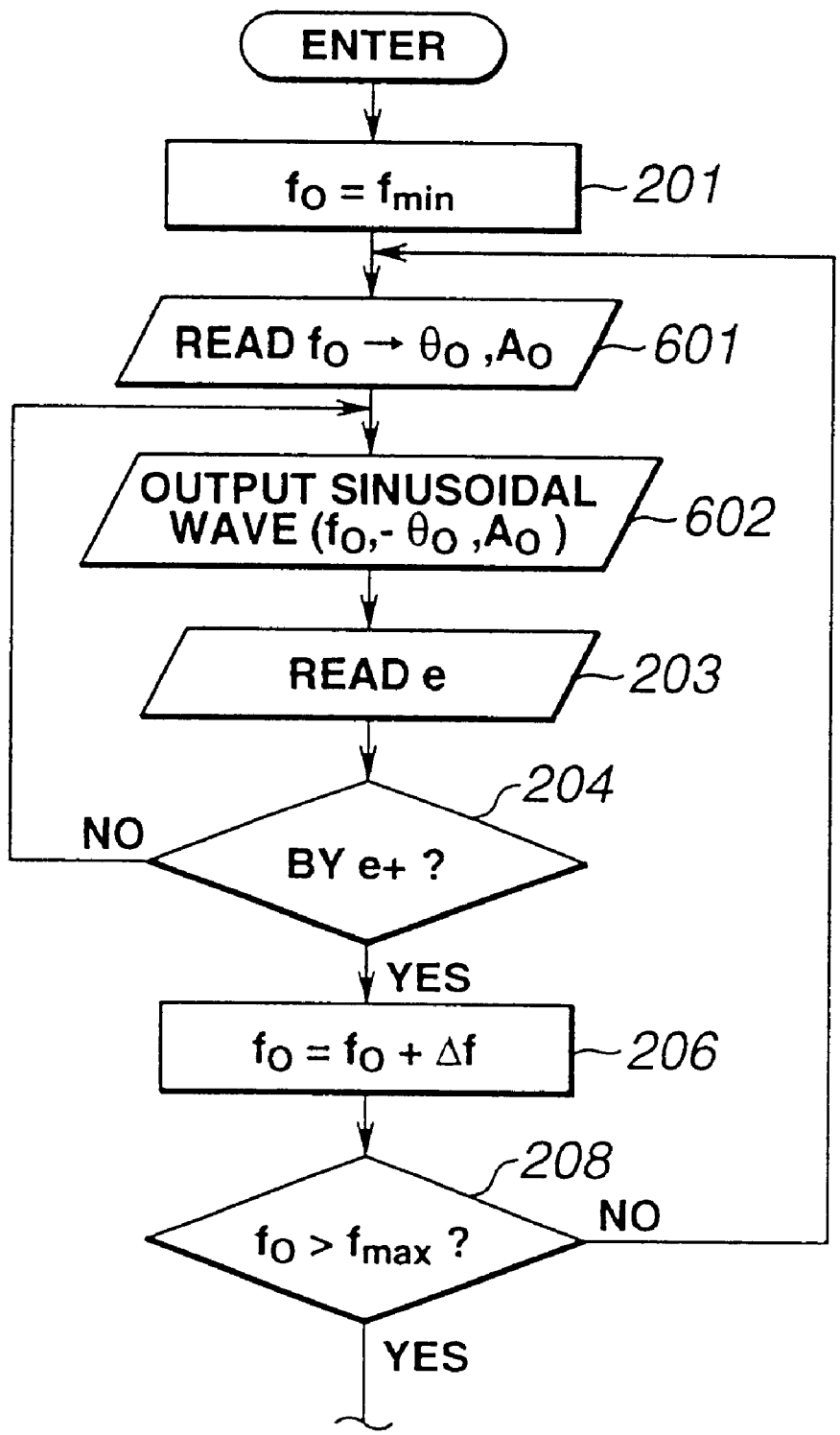
FIG. 15 is an operational flowchart for explaining a part of the identification process of the transfer function in the case of a fifth preferred embodiment according to the present invention.

FIGS. 15 and 16 show a fifth preferred embodiment of the actively vibration reducing apparatus according to the present invention.

FIG. 15 shows a flowchart indicating a part of the identification processing executed in the fifth embodiment.

Figure 16A:
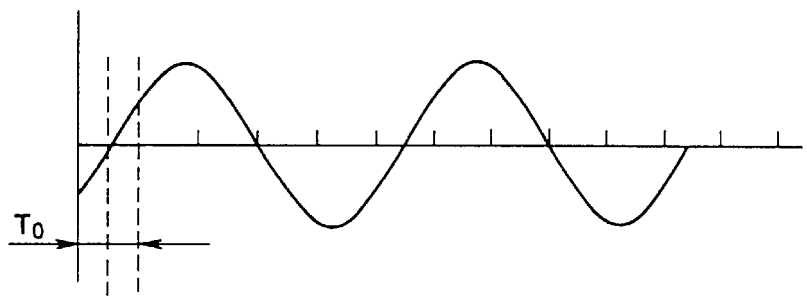
FIGS. 16A and 16B are waveform charts of the identification signal for explaining an operation of the fifth preferred embodiment.
Figure 16B:
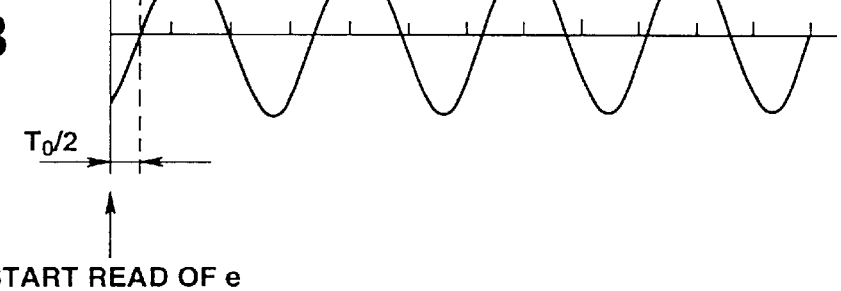

FIGS. 16A and 16B show waveform charts indicating the identification signal outputted from the controller 25 during the execution of the identification process. FIG. 16A being an example of the identification signal having a relatively low frequency and FIG. 16B being an example of the identification signal having the relatively high frequency. The other structure in the fifth embodiment is the same as that in the first embodiment.

In details, in place of the technique used in each of the second, third, and fourth preferred embodiments, the phase and amplitude of the identification signal are properly selected so that the phase characteristic and the gain characteristic of the impulse response as the finally derived transfer function are made so as to have high accuracies in the same way as described in the second embodiment.

Specifically, as shown in FIG. 15, the routine goes from the step 201 to the step 601.

The phase delay θo is read by referring to the table, for example, as shown in FIG. 9 on the basis of the present frequency fo of the identification signal and the amplitude Ao is read by referring to the table, for example, as shown in FIG. 10.

Then, the routine goes to a step 602 to output the identification signal in a sinusoidal waveform having the frequency fo, the phase (-θo), and the amplitude Ao.

Then, the routine goes to the step 203 to read the residual vibration signal e. The processings of the steps 602 and 203 are repeated until the determination at the step 204 gives "YES".

If the determination at the step 208 is "NO", the routine returns to the step 601 and the above-described processing is repeatedly executed in accordance with the new frequency fo.

When such a processing as described above is executed, the identification signal is provided with the phase delay (lag) corresponding to the time width (To/2).

In other words, since, for example, as shown in FIGS. 16A and 16B, the phase delay corresponding to the time width (To/2) is provided for the whole identification signal, the phase delay is included in the transfer function as a part of the characteristics of the vibration transmission system.

As a result of this, the accuracy of the phase characteristic of the transfer function filter C⁻ can be improved in the same way as the second embodiment.

In addition, since, at the step 601, the amplitude Ao is set for each frequency fo so that as the frequency becomes high, as shown in FIG. 10, the amplitude becomes small, the difference in amplitude Ao for each frequency is included in the transfer function as a part of the characteristic of the vibration transmission system. The accuracy of the gain characteristic of the transfer function filter C⁻ can be improved.

The same result and advantage in the fifth embodiment as those described in the second embodiment can be achieved.

In addition, in the fifth embodiment, since the phase and amplitude of the identification signal are adjusted, the calculation processing is not increased as in each embodiment of the second and third embodiments and the calculation load on the controller 25 can be relieved.

Sixth Embodiment

Figure 17:
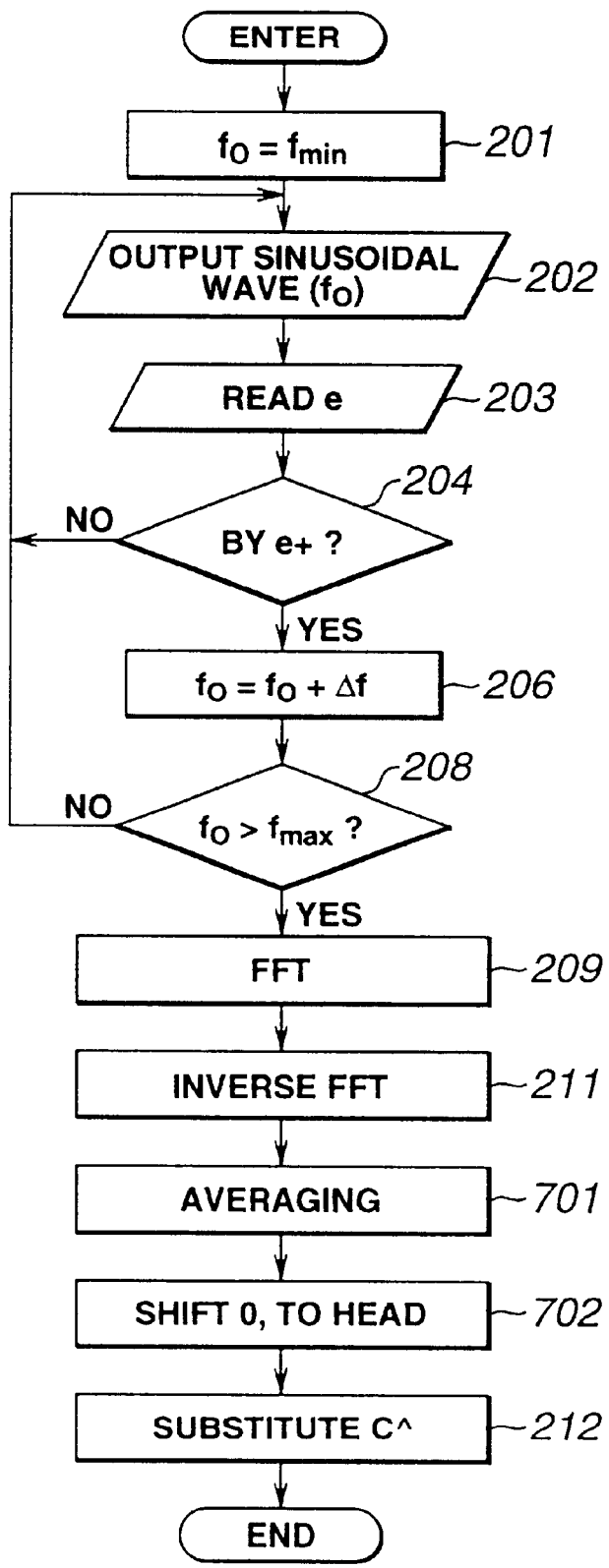
FIG. 17 is a flowchart for explaining the identification process of the transfer function in a case of a sixth preferred embodiment according to the present invention.
Figures 18A, 18B:
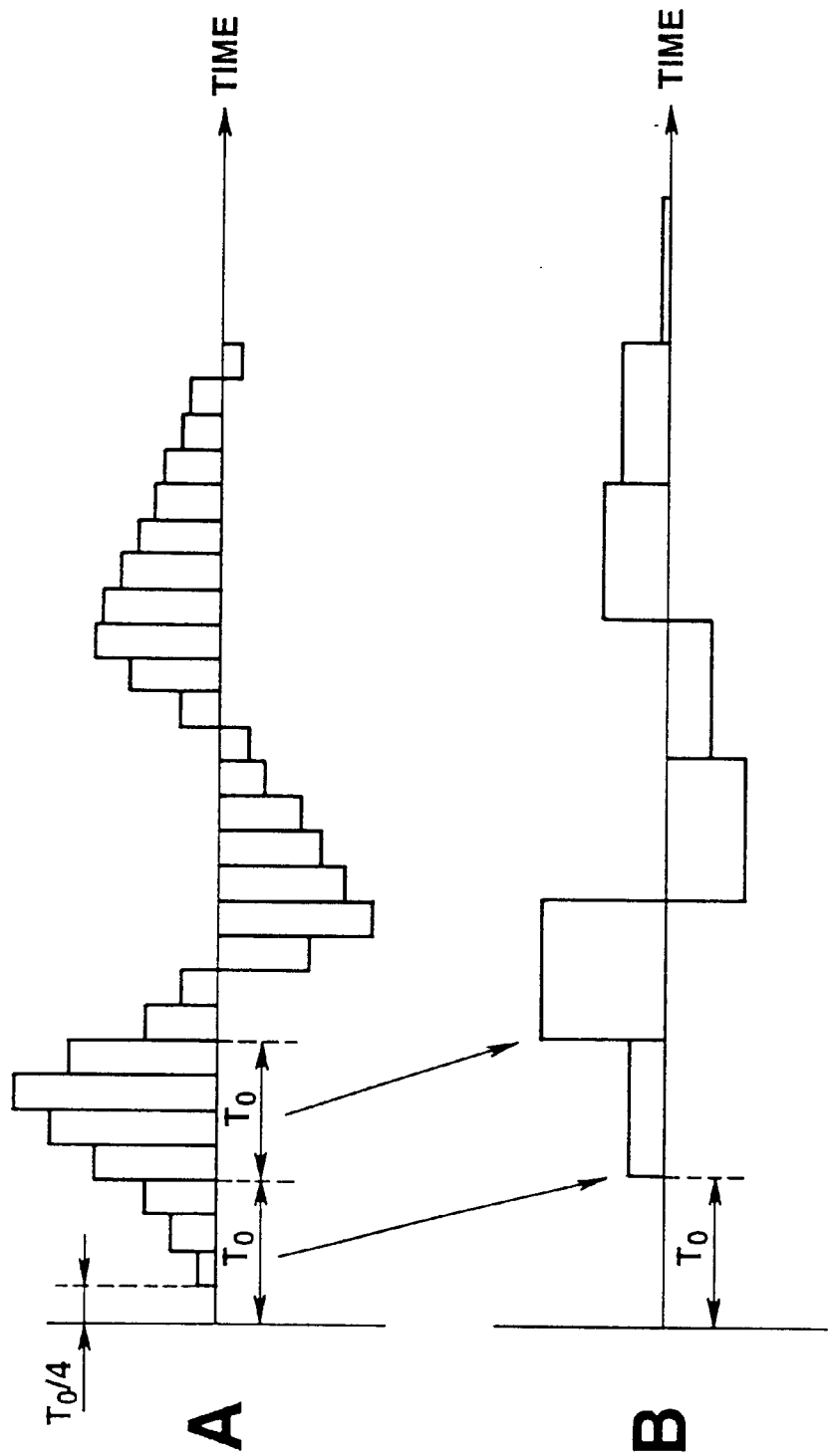
FIGS. 18A and 18B are waveform charts for explaining an operation of the sixth preferred embodiment.

FIGS. 17 through 18B show a sixth preferred embodiment of the actively vibration reducing apparatus according to the present invention.

FIG. 17 shows a flowchart of a part of the identification process of the transfer function.

The other structure of the sixth embodiment is the same as that in the first embodiment.

That is to say, since, in the sixth embodiment, the CPU of the controller 25 reads the residual vibration signal e in synchronization with the sampling clock furthermore finer than the sampling clock used for the vibration reduction control so as to derive the impulse response (transfer function filter C⁻) which is a discrete signal having an interval between each signal component shorter than the period To.

Specifically, the process at each step 202 and 203 is executed at any one of 1n interval (n denotes an arbitrary integer equal to 2 or more) of the period To to generate the time series of the residual vibration signal e at the interval of (To/n).

Then, if the generated time series is used to execute the processes of the steps 209 and 211.

Thus, the discrete impulse response at the interval of To/n is once derived.

If the impulse response is derived, the routine of FIG. 17 goes to a step 701 in which each numerical value of the discrete impulse response at the interval of To/n is retrieved sequentially by an n number from a head and is averaged.

In details, at the step 701, each numerical value of the impulse response derived at the step 211 is averaged for each period To to generate a new time series.

Then, the routine goes to a step 702 in which the CPU of the controller 25 shifts the new time series derived at the step 701 backward on the time axis one by one and the new time series in which 0 is added to its head is the impulse response as a finally achieved transfer function.

Then, the routine of FIG. 17 goes to the step 212 in which the impulse response as the final transfer function is substituted into the transfer function filter C⁻ used for the vibration reduction control.

FIGS. 18A and 18B show waveforms, each indicating one example of the operation result in the sixth embodiment.

FIG. 18A shows the pulse response (an impulse response at an excessive sampling) derived at the step 211 of FIG. 17 when n=4. Then, at the step 701, the average value to the excessively sampled impulse response is derived for each period To and each average value corresponds to a value which is just an intermediate value within the corresponding one period To.

FIG. 18B shows the impulse response as each time series derived at the step 701 and in which 0 is added to its head.

When each time series derived at the step 701 is shifted one by one backward on the time axis, each numerical value of the corresponding one time series gives the intermediate value within the period To.

Consequently, each time series becomes equivalent to the pulse response for which the phase lag (delay) corresponding to the time width (To/2).

Hence, the accuracy of the phase characteristic of the transfer function C⁻ can be improved.

Others

The actively vibration reducing control apparatus is applicable not only to the automotive vehicle as described in each embodiment but also to another actively vibration reducing control apparatus which actively reduces the vibration developed from and transmitted from a vibration source other than the engine 30 shown in FIG. 1A.

For example, the present invention is applicable to an apparatus for actively reducing the vibration developed from a machine tool and transmitted toward a floor or an inside of a factory compartment on which the machine tool is installed.

Although the synchronous type Filtered-X LMS algorithm is applied to each embodiment as the control algorithm to generate the drive signal y, the applicable algorithm may be, for example, a normal type Filtered-X LMS algorithm.

It is noted that the numerical value of each of the minimum value fmin, the maximum value fmax, the minimum value $f_L$, and the maximum value $f_U$ is only the example and is properly set according to the characteristic of the controlled object to which the present invention is applicable.

Furthermore, the tables shown in FIGS. 9 and 10 are only the exmaples. The table shown in FIG. 9 and representing the phase delay (lag) may properly be set according to the period To of the sampling clock for the vibration reduction control and the table shown in FIG. 10 and representing the gain characteristic may properly be set according to the period To of the sampling clock and the characteristic of the vibration transmission system.

Figure 19A:
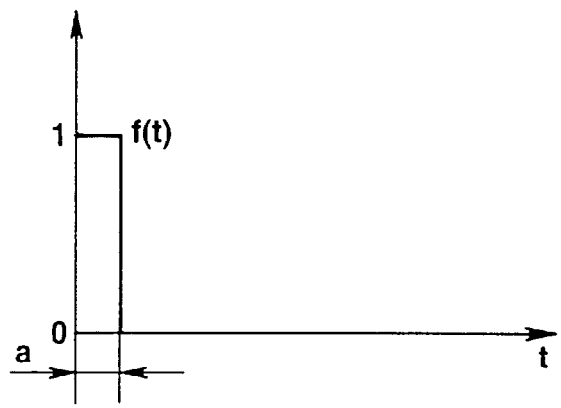
FIGS. 19A and 19B are explanatory views of a pulse formed signal.

A theoretical concept on the processes at the steps 301 and 302 in the second embodiment and on the processes at the steps 401 and 402 in the third embodiment will be described below in details with reference to FIGS. 19A, 19B, and 20.

That is to say, an inverse Fourier transform of a frequency response is the pulse response.

The response to a pulse-shaped input having a width of the period To of the sampling clock is actually required as the transfer function filter C⁻.

A Laplace transform of the impulse response is resulted in 1.

Figure 19B:
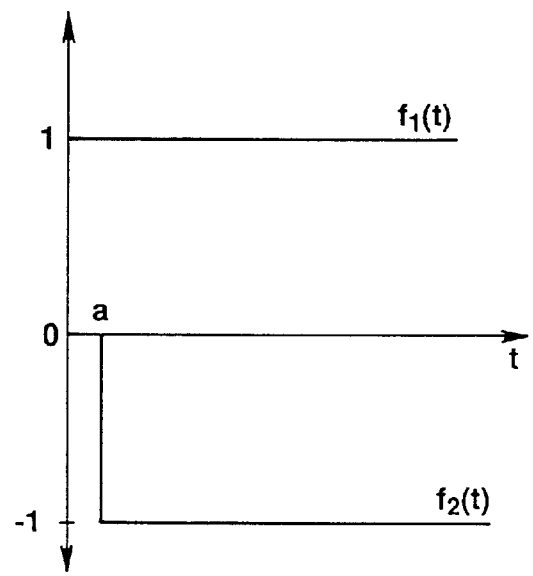

On the other and, a signal f(t) in the pulse shape having the width a as shown in FIG. 19 an be expressed as a sum of two steps functions f1(t) and f2(t) as shown in FIG. 19B.

That is to say, f(t)=f1(t)+f2(t).

Hence, the Laplace transform of f(t) is expressed as: $F(s)=1s-1/s\ e^{-as}$ . . . (2)', wherein s denotes a Laplace transform operator and s=jω.

When the frequency characteristic is derived when jω is substituted into s in the equation (2)', $$F(j\omega)=-\{\sin(a\omega)+j(1-\cos(a\omega))\}/\omega \tag{2}''$$

The gain thereof is $$|F(j\omega)|=\{2(1-\cos(a\omega))\}^{1/2}/\omega \tag{3}$$

The phase delay (lag) is $$\angle F(j\omega)=(1-\cos(a\omega))/\sin(a\omega) \tag{4}$$

The signal f(t) in the pulse shape having the width of a has the relations of the equations (3) and (4) with respect to a true impulse signal.

Hence, the similar relations (the case where the comparison is made in terms of the frequency characteristic) are present between the response waveform to the signal f(t) in the pulse shape having the width a and the response waveform to the true impulse signal.

Hence, the corrections of the equations (3) and (4) are made to the impulse response so that the impulse response can be transferred into the response to the pulse-shaped signal.

Figure 20:
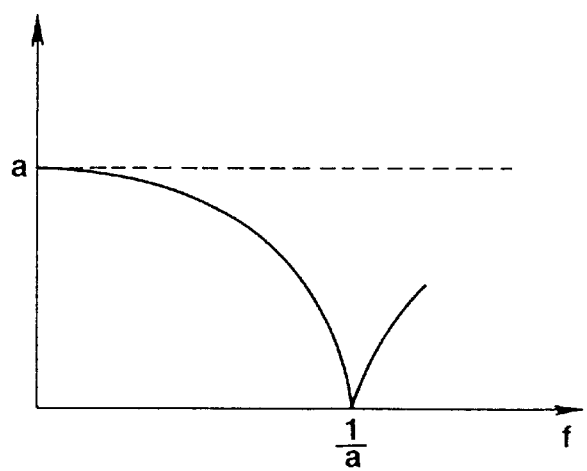
FIG. 20 is a frequency characteristic graph for explaining a gain characteristic of the pulse formed signal shown in FIGS. 19A and 19B.

The gain characteristic of the equation (3) is the characteristic shown in FIG. 20 and is divided by a so as to give a low-frequency gain to 1:

$$\{2(1=\cos(a\omega))\}^{1/2}/a\omega \tag{3}'$$

The phase lag (delay) of the equation 4) gives a time delay of a/2.

As described above, the method of correcting the gain characteristic is, specifically, such as to make the amplitude correction for the sinusoidal wave as the identification signal in accordance with the equation (3)', such as to make the amplitude correction for the process before the Fourier transform at the step 302 in accordance with the equation (3)', or such as to make the correction for multiplying the process after the Fourier transform at the step 402.

What is claimed is:

1. An adaptive control apparatus comprising:
   a vibration source;
   a control vibration source which is enabled to develop a control vibration to be interfered against a vibration developed form the vibration source;
   a reference signal generator for detecting a vibration developed condition of the vibration source and outputting the vibration developed condition indicative signal as a reference signal;
   a residual vibration detector for detecting a residual vibration signal after the interference of the control vibration against the vibration;

an active vibration controller for driving the control vibration source so as to reduce the vibration using a control algorithm including a transfer function between the control vibration source and the residual vibration detector based on the reference signal and the residual vibration signal;

an identification signal supplier for supplying each of identification signals in sinusoidal waveforms to the control vibration source;

a response signal reader for reading the residual vibration signal when the control vibration according to each of the identification signals is developed form the control vibration source in synchronization with a sampling clock;

a transfer function identifier for identifying the transfer function based on the residual vibration signal read by the response signal reader; and a frequency selector for selecting the one by one frequencies of the identification signals in the sinusoidal waveforms, the frequency selector selecting the frequencies of the respective identification signals in the sinusoidal waveforms so that a frequency interval between mutually adjacent selected frequencies in particular frequency band is shorter than that in any other frequency bands.

2. An adaptive control apparatus as claimed in claim 1, wherein the particular frequency band is a frequency band in which a resonance phenomenon continuously appears on a controlled object including the vibration source of the apparatus.

3. An adaptive control apparatus as claimed in claim 1, wherein the transfer function identifier includes: a Fourier transform calculator for performing a Fourier transform for the residual vibration signal read by the response signal reader to derive frequency components corresponding to the frequencies of the respective identification signals; an interpolation calculator for performing an interpolation based on the respective frequency components so that the frequency intervals of the respective frequency components derived by the Fourier transform calculator becomes uniform; and an inverse Fourier transform calculator for performing an inverse Fourier transform for a synthesized frequency component for the respective frequency interval uniformed frequency components by means of the interpolation calculator to derive an impulse response as the transfer function.

4. An adaptive control apparatus as claimed in claim 1, which further comprises a phase lag providing block for providing a phase lag corresponding to a time width half a period of the sampling clock for the transfer function to be derived by the transfer function identifier.

5. An adaptive control apparatus as claimed in claim 4, wherein the phase lag providing block delays the residual vibration signal read by the response signal reader by a half period (To/2) of the sampling clock so as to provide the phase lag for the transfer function.

6. An adaptive control apparatus as claimed in claim 4, wherein the transfer function identifier comprises: a Fourier transform calculator for performing a Fourier transform for the residual vibration signal read by the response signal reader to derive frequency components corresponding to the frequencies of the respective identification signals; and an inverse Fourier transform calculator for performing an inverse Fourier transform for a synthesized frequency components of the respective frequency components derived by the Fourier transform calculator and wherein the phase lag providing block provides the phase lag for a calculation result of the Fourier transform calculator.

7. An adaptive control apparatus as claimed in claim 4, wherein the transfer function identifier derives a discrete impulse response quantitized at the period of the sampling lock and the phase lag providing block delays the discrete impulse response by a half tap so as to provide the phase lag for the transfer function.

8. An adaptive control apparatus as claimed in claim 1, which further comprises a phase lag providing block for previously providing a phase lag corresponding to a time width half a period of the sampling clock for the respective identification signals in the sinusoidal waveforms.

9. An adaptive control apparatus as claimed in claim 1, wherein the transfer function identifier derives once the impulse response in a discrete form quantitized by a predetermined time interval which is shorter than a period of the sampling clock, averages each numerical value of the pulse response in the discrete form for each period of the sampling clock to generate a time series of the impulse response, and derives the time series of the impulse response in which zero is added to a head thereof as a finally derived impulse response.

10. An adaptive control apparatus as claimed in claim 9, wherein the predetermined time interval is a time width corresponding to 1n (n denotes an arbitrary integer equal to 2 or more) the period of the sampling clock.

11. An adaptive control apparatus as claimed in claim 1, which further comprises a gain characteristic corrector for correcting a gain characteristic of the transfer function to be derived by the transfer function identifier on the basis of a period of the sampling clock.

12. An adaptive control apparatus as claimed in claim 11, wherein the gain characteristic corrector reduces an amplitude of the residual vibration signal read by the response signal reader in such a way that as the frequency of each identification signal becomes high, a reduction width for the amplitude of the residual vibration signal becomes wide.

13. An adaptive control apparatus as claimed in claim 11, wherein the transfer function identifier comprises: a Fourier transform calculator for performing a Fourier transform for the residual vibration signal read by the response signal reader to derive frequency components corresponding to the frequencies of the respective identification signals; and an inverse Fourier transform calculator for performing an inverse Fourier transform for a synthesized frequency component of the respective frequency components derived by the Fourier transform calculator and wherein the gain characteristic corrector reduces a calculation width of the Fourier transform calculator in such a way that as the frequency of each identification signal becomes high, a reduction width for the calculation result of the Fourier transform calculator becomes wide.

14. An adaptive control apparatus as claimed in claim 4, which further comprises a gain characteristic corrector for correcting a gain characteristic of the transfer function to be derived by the transfer function identifier on the basis of the period of the sampling clock.

15. An adaptive control apparatus as claimed in claim 1, which further comprises an amplitude corrector for correcting an amplitude of each identification signal on the basis of a period of the sampling clock.

16. An adaptive control apparatus as claimed in claim 15, wherein the amplitude of each identification signal becomes small as the frequency of each identification signal becomes high.

17. An adaptive control apparatus as claimed in claim 6, wherein the phase lag providing block provides the phase lag ($\theta$) for a read part (A) and an imaginary part (B) of the freuqncy component for each frequency of the identification signals derived by the Fourier transform calculator in the following matrix:

$$\begin{bmatrix} A' \\ B' \end{bmatrix} = \begin{bmatrix} \cos\theta & -\sin\theta \\ \sin\theta & \cos\theta \end{bmatrix} \begin{bmatrix} A \\ B \end{bmatrix}$$

and wherein the phase lag (θ) becomes large as the frequency becomes high.

18. An adaptive control apparatus as claimed in claim 1, wherein the vibration source is a vehicular engine, the identification signal supplier supplies each of the identification signals as the sinusoidal waveforms to the control vibration source when a switch is turned on, the control vibration source comprises an active engine mount, the particular frequency band ranges from a minimum limit $f_U$ to a maximum limit $f_L$, $f_U$ being set to 20 Hz and $f_L$ being set to 80 Hz, the frequency (fo) of each identification signal being increased from a minimum value fmin (fmin=10 Hz) to the maximum limit (fmax) by a predetemined increment (Δf) and being increased from $f_U$ to $F_L$ by a half of the predetermined increment (Δf/2), and being increased from above $f_U$ to a maximum value fmax (fmax=100 Hz) by the predetermined increment (Δf), and the identified transfer function C is substituted into a transfer function filter (C⁻) for he vibration reduction control purpose.

19. An adaptive control apparatus comprising:
a vibration source;
a control vibration source which is enabled to develop a control vibration to be interfered against a vibration developed from the vibrations source;
a reference signal generator for detecting a vibration developed condition of the vibration source and outputting the vibration developed condition indicative signal as a reference signal;
a residual vibration detector for detecting a residual vibration signal after the interference of the control vibration against the vibration;
an active vibration controller for driving the control vibration source so as to reduce the vibration using a control algorithm including a transfer function between the control vibration source and the residual vibration detector based on the reference signal and the residual vibration signal;
an identification signal supplier for supplying an identification signal in sinusoidal waveforms whose frequency is chargeable to the control vibration source;
a response signal reader for reading the residual vibration signal when the control vibration according to each of the identification signals is developed from the control vibration source in synchronization with a sampling clock;
a transfer function identifier for identifying the transfer function based on the residual vibration signal rad by the response signal reader; and
a frequency selector for selecting he frequency of the frequency changeable identification signal in he sinusoidal waveform at a first predetermined interval of frequency when the frequency of the identification signal falls in a particular frequency band and at a second predetermined interval of frequency when the frequency falls in any other frequency bands than the particular frequency band, the first predetermined interval of frequency being shorter than the second predetermined interval of frequency.

20. An adaptive control apparatus comprising:
a vibration source;
a control vibration source means for developing a control vibration to be interfered against a vibration developed from the vibration source;
a reference signal generating means for detecting a vibration developed condition of the vibration source and outputting the vibration developed condition indicative signal as a reference signal;
a residual vibration detecting means for detecting a residual vibration signal after the interference of the control vibration against the vibration;
an active vibration controlling means for driving the control vibration source means so as to reduce the vibration using a control algorithm including a transfer unction between the control vibration source means and the residual vibration detecting means based on the reference signal and the residual vibration signal;
an identification signal supplying means for supplying each of identification signals in sinusoidal waveforms to the control vibration source means;
a response signal reading means for reading the residual vibration signal when the control vibration according to each of the identification signals is developed from the control vibration source means in synchronization with a sampling clock;
a transfer function identifier for identifying the transfer function based on the residual vibration signal red by the response signal reader; and
a frequency selecting means for selecting one by one frequencies of the identification signals in the sinusoidal waveforms, the frequency selecting means selecting the frequencies of the respective identifications signals in the sinusoidal waveforms so that a frequency interval between mutually adjacent selected frequencies in a particular frequency band is sorter than that in any other frequency bands.

21. A method for actively controlling a reduction of a vibration developed and transmitted from a vibration source, comprising the steps of
providing a control vibration source which is enabled to develop a control vibration to be interfered against the vibration developed form the vibration source;
detecting a vibration developed condition of the vibration source and outputting the vibration developed condition indicative signal as a reference signal;
detecting a residual vibration signal after the interference of the control virbration against the vibration;
driving the control vibration source so as to reduce the vibration using a control algorithm including a transfer function between the control vibration source and the residual vibration detector based on the reference signal and the residual vibration signal;
supplying each of identification signals in sinusoidal waveforms to the control vibration source;
reading the residual vibration signal when the control vibration according to each of the identification signals is developed form the control vibration source in synchronization with a sampling clock,
identifying the transfer function based on the residual vibration signal read at the previous reading step; and
selecting one by one frequencies of the identifications signals in the sinusoidal waveforms, the selecting step selecting the frequencies of the respective identification signals in the sinusoidal waveforms so that a frequency interval between mutually adjacent selected frequencies in a particular frequency band is shorter than that in any other frequency bands, a vibration source;

a control vibration source means for developing a control vibration to be interfered against a vibration developed from the vibration source;

a reference signal generating means for detecting a vibration developed condition of the vibration source and outputting the vibration developed condition indicative signal as a reference signal;

a residual vibration detecting means for detecting a residual vibration signal after the interference of the control vibration against the vibration;

an active vibration controlling means for driving the control vibration source means so as to reduce the vibration using a control algorithm including a transfer function between the control vibration source means and he residual vibration detecting means based on the reference signal and the residual vibration signal;

an identification signal supplying means for supplying each of identification signals in sinusoidal waveforms to the control vibration source means;

a response signal reading means for reading the residual vibration signal when the control vibration according to each of the identification signals is developed form the control vibration source means in synchronization with a sampling clock;

a transfer function identifier for identifying the transfer function based on the residual vibration signal read by the response signal reader; and a frequency selecting means for selecting one by one frequencies of the identification signals in the sinusoidal waveforms, the frequency selecting means selecting the frequencies of the respective identification signals in the sinusoidal waveforms so that a frequency interval between mutually adjacent selected frequencies in a particular frequency band is shorter than that in nay other frequency bands.

* * * * *